(12) United States Patent
Piparsaniya et al.

(10) Patent No.: US 11,176,543 B2
(45) Date of Patent: Nov. 16, 2021

(54) VOICE CURRENCY TOKEN BASED ELECTRONIC PAYMENT TRANSACTIONS

(71) Applicant: Mastercard International Incorporated, Purchase, NY (US)

(72) Inventors: Harsh Piparsaniya, Pune (IN); Sudhir Gupta, Pune (IN); Rahul Agrawal, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 22 days.

(21) Appl. No.: 16/561,266

(22) Filed: Sep. 5, 2019

(65) Prior Publication Data
US 2020/0097952 A1 Mar. 26, 2020

(30) Foreign Application Priority Data
Sep. 22, 2018 (IN) .............................. 201811035755

(51) Int. Cl.
*G06Q 20/36* (2012.01)
*G06Q 20/38* (2012.01)

(52) U.S. Cl.
CPC ....... *G06Q 20/3674* (2013.01); *G06Q 20/382* (2013.01)

(58) Field of Classification Search
CPC ............. G06Q 20/3674; G06Q 20/382; G06Q 20/40145; G06Q 20/3223; G06Q 20/3272; G06Q 20/10; H04M 2203/105; H04M 3/493; G10L 15/1822; G06F 3/167
See application file for complete search history.

(56) References Cited

U.S. PATENT DOCUMENTS

| 8,831,941 | B2 * | 9/2014 | Gilbert | G06Q 20/382 |
| | | | | 704/246 |
| 9,852,424 | B2 * | 12/2017 | Broman | G06Q 20/40 |
| 10,003,690 | B2 * | 6/2018 | Bouzid | G06F 8/38 |
| 10,192,219 | B2 * | 1/2019 | Douglas | G06Q 20/3224 |

(Continued)

FOREIGN PATENT DOCUMENTS

CN 102419847 4/2012

OTHER PUBLICATIONS

"A Smart Card Alliance Payments Council White Paper, Technologies for Payment Fraud Prevention: EMV, Encryption and Tokenization"; Publication Date: Oct. 2014; Publication No. PC-14002; Smart Card Alliance; pp. 5-28 (Year: 2014).*

*Primary Examiner* — Christopher Bridges
*Assistant Examiner* — Tony P Kanaan
(74) *Attorney, Agent, or Firm* — Hovey Williams LLP

(57) ABSTRACT

The invention provides systems, methods and computer program products for secure electronic payment transactions based on voice generated currency tokens. The invention comprises implementing at a voice currency platform server, the steps of (i) receiving from a payor terminal device a request for generation of a voice currency token, (ii) performing voice based biometric authentication by matching the voice data received from the payor terminal device against one or more voice based biometric templates associated with the payor voice currency platform account, (iii) performing speech analysis to extract at least the currency amount identified within the voice data received from the payor terminal device and (iv) generating an encrypted voice currency token.

18 Claims, 14 Drawing Sheets

(56) References Cited

U.S. PATENT DOCUMENTS

| | | | | |
|---|---|---|---|---|
| 10,497,037 | B2* | 12/2019 | Isaacson | G06Q 20/12 |
| 10,853,816 | B1* | 12/2020 | Gaeta | G06Q 20/40145 |
| 10,956,907 | B2* | 3/2021 | Parnell | G06Q 20/40145 |
| 2011/0047628 | A1 | 2/2011 | Viars | |
| 2011/0213706 | A1* | 9/2011 | Joshi | G06Q 20/40 |
| | | | | 705/44 |
| 2011/0258121 | A1* | 10/2011 | Kauniskangas | G06Q 20/20 |
| | | | | 705/67 |
| 2013/0339245 | A1* | 12/2013 | Epstein | G06Q 20/4016 |
| | | | | 705/44 |
| 2014/0337206 | A1* | 11/2014 | Talker | G06Q 20/0658 |
| | | | | 705/41 |
| 2014/0372128 | A1* | 12/2014 | Sheets | G06Q 20/20 |
| | | | | 704/273 |
| 2014/0379342 | A1* | 12/2014 | Li | G06Q 20/40145 |
| | | | | 704/246 |
| 2015/0149354 | A1* | 5/2015 | McCoy | G06F 3/167 |
| | | | | 705/42 |
| 2015/0193776 | A1* | 7/2015 | Douglas | G06Q 20/40145 |
| | | | | 705/16 |
| 2017/0255923 | A1* | 9/2017 | Dieter | G06Q 20/204 |
| 2017/0323297 | A1* | 11/2017 | Shanmugam | G06Q 20/223 |
| 2018/0039990 | A1* | 2/2018 | Lindemann | G06F 21/32 |
| 2019/0130390 | A1* | 5/2019 | Bohra | G06Q 20/363 |
| 2019/0164156 | A1* | 5/2019 | Lindemann | H04L 9/0894 |
| 2019/0244196 | A1* | 8/2019 | John | G06Q 20/24 |
| 2019/0392443 | A1* | 12/2019 | Piparsaniya | G06Q 20/22 |
| 2020/0090147 | A1* | 3/2020 | Cole | G06Q 20/108 |
| 2020/0168030 | A1* | 5/2020 | Kubajak | G07F 17/3227 |

\* cited by examiner

| Voice Currency Token Data Record | |
|---|---|
| Payor Account ID | |
| Currency Amount Associated with the Voice Currency Token | |
| Token Validity Period | |
| Designated Payee Account | |
| An association between the payor's account ID and a part or whole of the currency amount associated with the voice currency token | |

Figure 4B

VOICE CURRENCY TOKEN BASED ELECTRONIC PAYMENT TRANSACTIONS

CROSS REFERENCE TO RELATED APPLICATIONS

This application claims priority to Indian Application Serial No. 201811035755, filed Sep. 22, 2018, which is incorporated herein by reference in its entirety

FIELD OF THE INVENTION

The invention relates to payment transactions based on electronic currency tokens. In particular, the invention provides systems, methods and computer program products for secure electronic payment transactions based on voice generated currency tokens.

BACKGROUND

Electronic transactions and payments using payment cards or electronic payment accounts are increasingly common—with the number of electronic payment transactions and ubiquity of electronic transaction mechanisms and services growing steadily. Wallet based payments has also increased significantly in the recent past—such payments offering convenient options for users to readily transfer payment.

Existing electronic wallets are however heavily dependent on a user being able to interact with a graphical user interface displayed on a terminal device (for example the display of a computing device or smartphone)—and on the user being able to conveniently navigate through the displayed user interface. This poses challenges to users who are unfamiliar with computers or software interfaces, users who have physical disabilities that prevent them from easily navigating touch based or key based interfaces, users who are visually impaired and who therefore cannot navigate interfaces that require sight based abilities, or even users who have their hands full (for example a user who is driving).

There is accordingly a need for an electronic payment system that provides a simplified payment interface for electronic payments that addresses the above challenges while simultaneously meeting the following requirements of electronic payments:

- Security—to prevent fraudulent interference with transactions involving electronic currency—particularly when such transactions are over public communications systems such as the Internet
- Authentication—to ensure that users of the electronic currency based payment system can verify, without needing to contact the bank or currency issuer, that the electronic currency that they receive is valid (i.e. not forged), has not already been spent, and will be honored by a bank or the currency issuer
- Anonymity—to assure users of the electronic currency that the transactions and transfers in which they are involved will, if desired remain confidential, in the same manner as cash transactions
- Transferability—to enable the electronic currency to be transferred to anyone independent of the type of transaction or transfer, and regardless of the identity of the concerned transferor and transferee
- Independence—to enable the electronic currency to be spent and received independent of the physical location of the parties to the transaction

SUMMARY

The invention provides systems, methods and computer program products for secure electronic payment transactions based on voice generated currency tokens.

The invention provides a method for implementing a voice currency token based payment system. The method comprises implementing at a voice currency platform server, the steps of (i) receiving from a payor terminal device (a) a request for generation of a voice currency token, (b) a payor account ID identifying a payor voice currency platform account associated with a payor, and (c) voice data comprising information identifying a currency amount to be included within the requested voice currency token, (ii) performing a first voice based biometric authentication by matching the voice data received from the payor terminal device against one or more voice based biometric templates associated with the payor voice currency platform account, (iii) performing speech analysis to extract at least the currency amount identified within the voice data received from the payor terminal device, (iv) responsive to the first voice based biometric authentication generating a positive identity match, generating an encrypted voice currency token. Generating the encrypted voice currency token comprises (i) generating a voice currency token data record comprising (a) the payor account ID (b) the currency amount identified within the received voice data, and (c) an association between at least a part of the currency amount within the generating voice currency data record and the payor voice currency platform account, and (ii) generating an encrypted voice currency token, wherein the encrypted voice currency token is generated by encrypting the voice currency token data record.

The voice currency platform server may (i) receive a payee account ID identifying a payee voice currency platform account associated with a designated payee corresponding to the requested voice currency token, (ii) include the payee account ID within the generated voice currency token data record, and (iii) record an association between the generated encrypted voice currency token and the payee voice currency platform account.

The voice currency platform server may include a voice currency token validity period within the generated voice currency token data record.

The step of generating the encrypted voice currency token may in an embodiment output a playable audio file configured such that playback of the audio file results in presentation of audio output that omits the contents of information fields within the generated voice currency data record.

In another embodiment, the step of generating the encrypted voice currency token is followed by transmitting to at least one of a payor terminal device and a designated payee terminal device, any of the encrypted voice currency token, a token ID corresponding to the encrypted voice currency token, an electronic link to a location where the encrypted voice currency token is stored, and confirmation regarding generation of the voice currency token.

The method may include the further steps of (i) receiving from a payee terminal device, a request for encashment of the encrypted voice currency token, (ii) decrypting the encrypted voice currency token and extracting from the voice currency data record corresponding to the encrypted voice currency token, (a) the payor account ID and (b) the currency amount identified within said voice currency data record, (iii) receiving information identifying a payee account ID identifying a payee voice currency platform account, (iv) identifying a payor bank account associated with the payor voice currency platform account, (v) identifying a payee bank account associated with the payee voice currency platform account, and (vi) initiating transfer of the extracted currency amount from the payor bank account to the payee bank account.

In a method embodiment, the information identifying the payee account ID is either received from the payee terminal device or is extracted from the voice currency data record corresponding to the encrypted voice currency token.

In a further embodiment, subsequent to transferring the extracted currency amount from the payor bank account to the payee bank account, a data record corresponding to the encrypted voice currency token is modified to indicate that said encrypted voice currency token is non-redeemable.

The method may additionally comprise generating an incremented encrypted voice currency token, wherein generating the incremented encrypted voice currency token comprises (i) receiving from an incrementing payor terminal device (a) a request for incrementing the encrypted voice currency token, (b) an incrementing payor account ID identifying an incrementing payor voice currency platform account associated with an incrementing payor, and (c) voice data comprising information identifying an incremental currency amount to be incremented to the currency amount within the encrypted voice currency token, (ii) performing a second voice based biometric authentication by matching the voice data received from the incrementing payor terminal against one or more voice based biometric templates associated with the incrementing payor voice currency platform account, (iii) performing speech analysis to extract at least the currency amount identified within the voice data received from the incrementing payor terminal, and (iv) responsive to the second voice based biometric authentication generating a positive identity match, generating an incremented encrypted voice currency token. Generating the incremented encrypted voice currency token may comprise (i) generating an incremented voice currency token data record comprising (a) the payor account ID (b) the incrementing payor account ID, (c) an aggregated currency amount having a value equal to an aggregation of the currency amount of the encrypted voice currency token and the incremental currency amount, (d) an association between the payor voice currency platform account and the currency amount of the encrypted voice currency token, and (e) an association between the incrementing payor voice currency platform account and the incremental currency amount, and (ii) generating an incremented encrypted voice currency token, wherein the encrypted voice currency token is generated by encrypting the incremented voice currency token data record.

The method may include the steps of (i) receiving from a payee terminal device, a request for encashment of the incremented encrypted voice currency token, (ii) decrypting the incremented encrypted voice currency token and extracting from the voice currency data record corresponding to the encrypted voice currency token, (a) the payor account ID, (b) the aggregated currency amount identified within said voice currency data record, (c) the association between the payor voice currency platform account and the currency amount of the encrypted voice currency token, and (d) the association between the incrementing payor voice currency platform account and the incremental currency amount, (ii) receiving information identifying a payee account ID identifying a payee voice currency platform account, (iii) identifying a payor bank account associated with the payor voice currency platform account, (iv) identifying an incrementing payor bank account associated with the incrementing payor voice currency platform account, (v) identifying a payee bank account associated with the payee voice currency platform account, (vi) transferring a first currency amount having a value equal to the currency amount of the encrypted voice currency token from the payor bank account to the payee bank account, and (vii) transferring a second currency amount having a value equal to the incremental currency amount from the incrementing payor bank account to the payee bank account.

In a method embodiment, information identifying the payee account ID is either received from the payee terminal device or is extracted from the voice currency data record corresponding to the incremented encrypted voice currency token.

In a specific method embodiment, subsequent to transferring the first currency amount from the payor bank account to the payee bank account and the second currency amount from the incrementing payor bank account to the payee bank account, a data record corresponding to the incremented encrypted voice currency token is modified to indicate that said incremented encrypted voice currency token is non-redeemable.

The invention also provides a system for implementing a voice currency token based payment system. The system comprises a voice currency platform server, configured to implement the steps of (i) receiving from a payor terminal device (a) a request for generation of a voice currency token, (b) a payor account ID identifying a payor voice currency platform account associated with a payor, and (c) voice data comprising information identifying a currency amount to be included within the requested voice currency token, (ii) performing a first voice based biometric authentication by matching the voice data received from the payor terminal device against one or more voice based biometric templates associated with the payor voice currency platform account, (iii) performing speech analysis to extract at least the currency amount identified within the voice data received from the payor terminal device, (iv) responsive to the first voice based biometric authentication generating a positive identity match, generating an encrypted voice currency token. Generating the encrypted voice currency token comprises (i) generating a voice currency token data record comprising (a) the payor account ID (b) the currency amount identified within the received voice data, and (c) an association between at least a part of the currency amount within the generating voice currency data record and the payor voice currency platform account, and (ii) generating an encrypted voice currency token, wherein the encrypted voice currency token is generated by encrypting the voice currency token data record.

In a system embodiment, the voice currency platform server is configured to (i) receive a payee account ID identifying a payee voice currency platform account associated with a designated payee corresponding to the requested voice currency token, (ii) include the payee account ID within the generated voice currency token data record, and (iii) record an association between the generated encrypted voice currency token and the payee voice currency platform account.

The voice currency platform server may be configured to include a voice currency token validity period within the generated voice currency token data record.

In generating the encrypted voice currency token, the voice currency platform server may output a playable audio file configured such that playback of the audio file results in presentation of audio output that omits the contents of information fields within the generated voice currency data record.

In a system embodiment, generating the encrypted voice currency token is followed by transmitting to at least one of a payor terminal device and a designated payee terminal device, any of the encrypted voice currency token, a token ID corresponding to the encrypted voice currency token, an electronic link to a location where the encrypted voice currency token is stored, and confirmation regarding generation of the voice currency token.

The voice currency platform server may be configured to (i) receive from a payee terminal device, a request for encashment of the encrypted voice currency token, (ii) decrypt the encrypted voice currency token and extract from the voice currency data record corresponding to the encrypted voice currency token, (a) the payor account ID and (b) the currency amount identified within said voice currency data record, (iii) receive information identifying a payee account ID identifying a payee voice currency platform account, (iv) identify a payor bank account associated with the payor voice currency platform account, (v) identify a payee bank account associated with the payee voice currency platform account, and (vi) initiate transfer of the extracted currency amount from the payor bank account to the payee bank account.

In a system embodiment, the information identifying the payee account ID is either received from the payee terminal device or is extracted from the voice currency data record corresponding to the encrypted voice currency token.

Subsequent to transferring the extracted currency amount from the payor bank account to the payee bank account, the voice currency platform server may modify a data record corresponding to the encrypted voice currency token to indicate that said encrypted voice currency token is non-redeemable.

The voice currency platform server may be configured to generate an incremented encrypted voice currency token. Generating the incremented encrypted voice currency token comprises (i) receiving from an incrementing payor terminal device (a) a request for incrementing the encrypted voice currency token, (b) an incrementing payor account ID identifying an incrementing payor voice currency platform account associated with an incrementing payor, and (c) voice data comprising information identifying an incremental currency amount to be incremented to the currency amount within the encrypted voice currency token, (ii) performing a second voice based biometric authentication by matching the voice data received from the incrementing payor terminal against one or more voice based biometric templates associated with the incrementing payor voice currency platform account, (iii) performing speech analysis to extract at least the currency amount identified within the voice data received from the incrementing payor terminal, and (iv) responsive to the second voice based biometric authentication generating a positive identity match, generating an incremented encrypted voice currency token. Generating the incremented encrypted voice currency token comprises (i) generating an incremented voice currency token data record comprising (a) the payor account ID (b) the incrementing payor account ID, (c) an aggregated currency amount having a value equal to an aggregation of the currency amount of the encrypted voice currency token and the incremental currency amount, (d) an association between the payor voice currency platform account and the currency amount of the encrypted voice currency token, and (e) an association between the incrementing payor voice currency platform account and the incremental currency amount, and (ii) generating an incremented encrypted voice currency token, wherein the encrypted voice currency token is generated by encrypting the incremented voice currency token data record.

The voice currency platform server may be configured to (i) receive from a payee terminal device, a request for encashment of the incremented encrypted voice currency token, (ii) decrypt the incremented encrypted voice currency token and extract from the voice currency data record corresponding to the encrypted voice currency token, (a) the payor account ID (b) the aggregated currency amount identified within said voice currency data record; (c) the association between the payor voice currency platform account and the currency amount of the encrypted voice currency token, and (d) the association between the incrementing payor voice currency platform account and the incremental currency amount, (ii) receive information identifying a payee account ID identifying a payee voice currency platform account, (iii) identify a payor bank account associated with the payor voice currency platform account, (iv) identify an incrementing payor bank account associated with the incrementing payor voice currency platform account; (v) identify a payee bank account associated with the payee voice currency platform account, (vi) initiate transfer of a first currency amount having a value equal to the currency amount of the encrypted voice currency token from the payor bank account to the payee bank account; and (vii) initiate transfer of a second currency amount having a value equal to the incremental currency amount from the incrementing payor bank account to the payee bank account.

In an embodiment of the system the information identifying the payee account ID is either received from the payee terminal device or is extracted from the voice currency data record corresponding to the incremented encrypted voice currency token.

In a particular embodiment of the system subsequent to transferring the first currency amount from the payor bank account to the payee bank account and the second currency amount from the incrementing payor bank account to the payee bank account, the voice currency platform server modifies a data record corresponding to the incremented encrypted voice currency token to indicate that said incremented encrypted voice currency token is non-redeemable.

In an embodiment, the invention comprises a computer program product for implementing a voice currency token based payment system. The computer program product comprises a non-transitory computer usable medium having computer readable program code embodied therein, the computer readable program code comprising instructions for implementing any of the method embodiments described in the disclosure herein. In a specific embodiment, the non-transitory computer usable medium comprises computer readable program code comprising instructions for implementing the steps of (i) receiving from a payor terminal device (a) a request for generation of a voice currency token, (b) a payor account ID identifying a payor voice currency platform account associated with a payor, and (c) voice data comprising information identifying a currency amount to be included within the requested voice currency token, (ii) performing a first voice based biometric authentication by matching the voice data received from the payor terminal device against one or more voice based biometric templates associated with the payor voice currency platform account, (iii) performing speech analysis to extract at least the currency amount identified within the voice data received from the payor terminal device, (iv) responsive to the first voice based biometric authentication generating a positive identity match, generating an encrypted voice currency token. Generating the encrypted voice currency token may comprise (i) generating a voice currency token data record comprising (a) the payor account ID, (b) the currency amount identified within the received voice data, and (c) an association between at least a part of the currency amount within the generating voice currency data record and the payor voice currency platform account, and (ii) generating an encrypted voice currency token, wherein the encrypted voice currency token is generated by encrypting the voice currency token data record.

BRIEF DESCRIPTION OF THE ACCOMPANYING DRAWINGS

Figure 3:
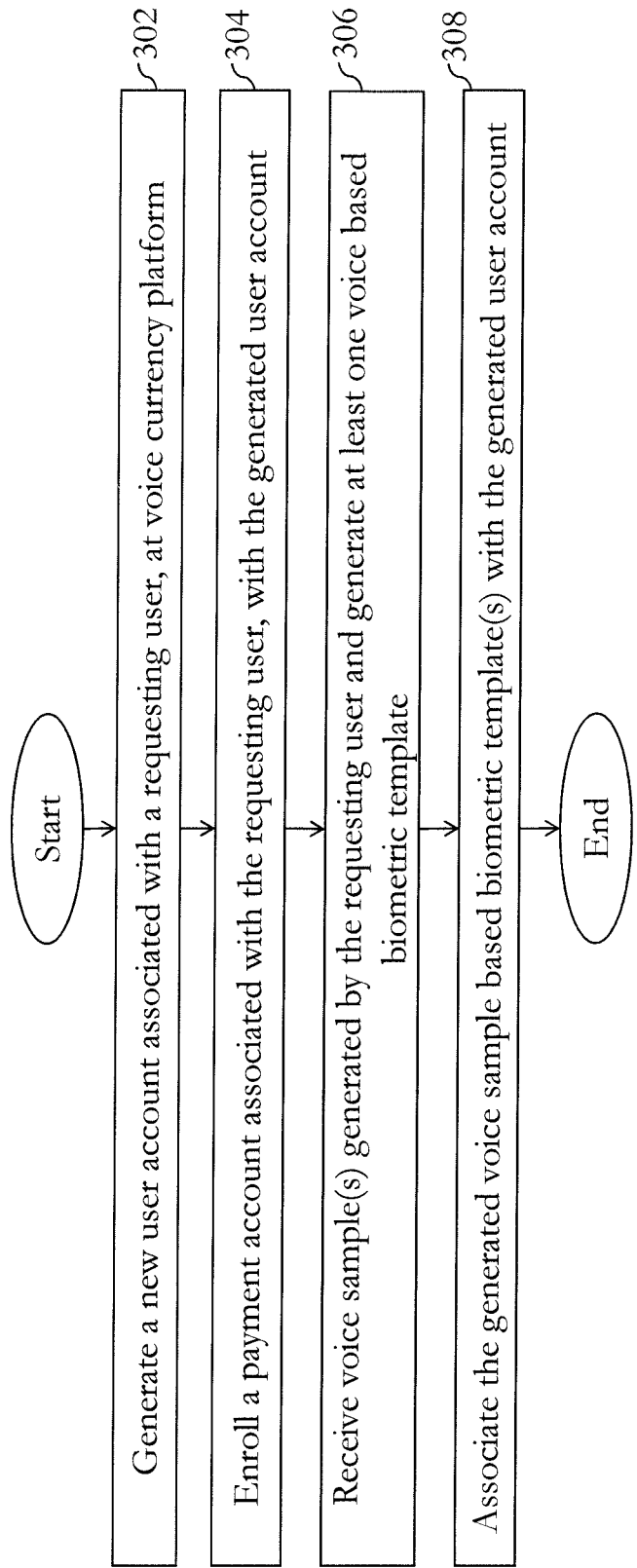

FIG. 3 comprises a flowchart illustrating a method of creating a user account at voice currency platform server.

Figure 4A:
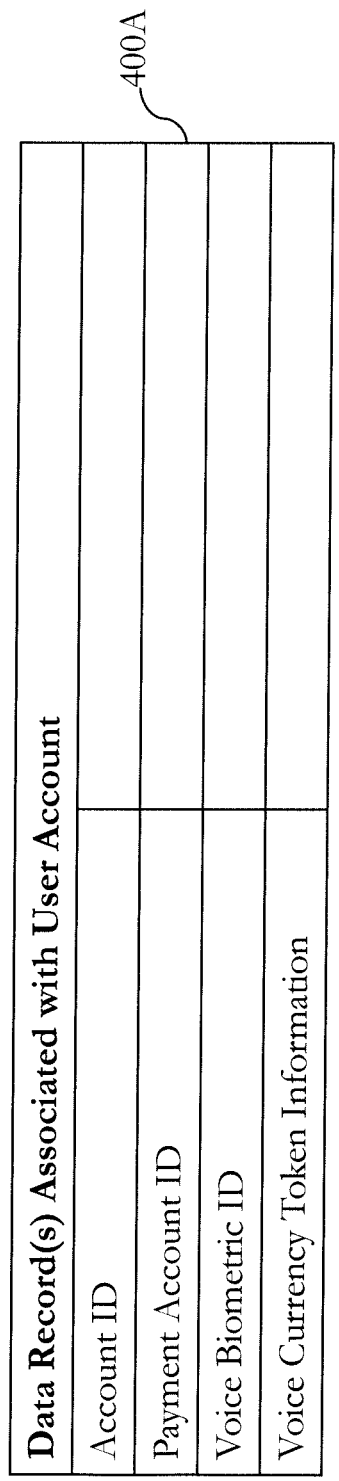

FIGS. 4A and 4B illustrate exemplary data record structures for use in connection with embodiments of the invention.

Figure 5:
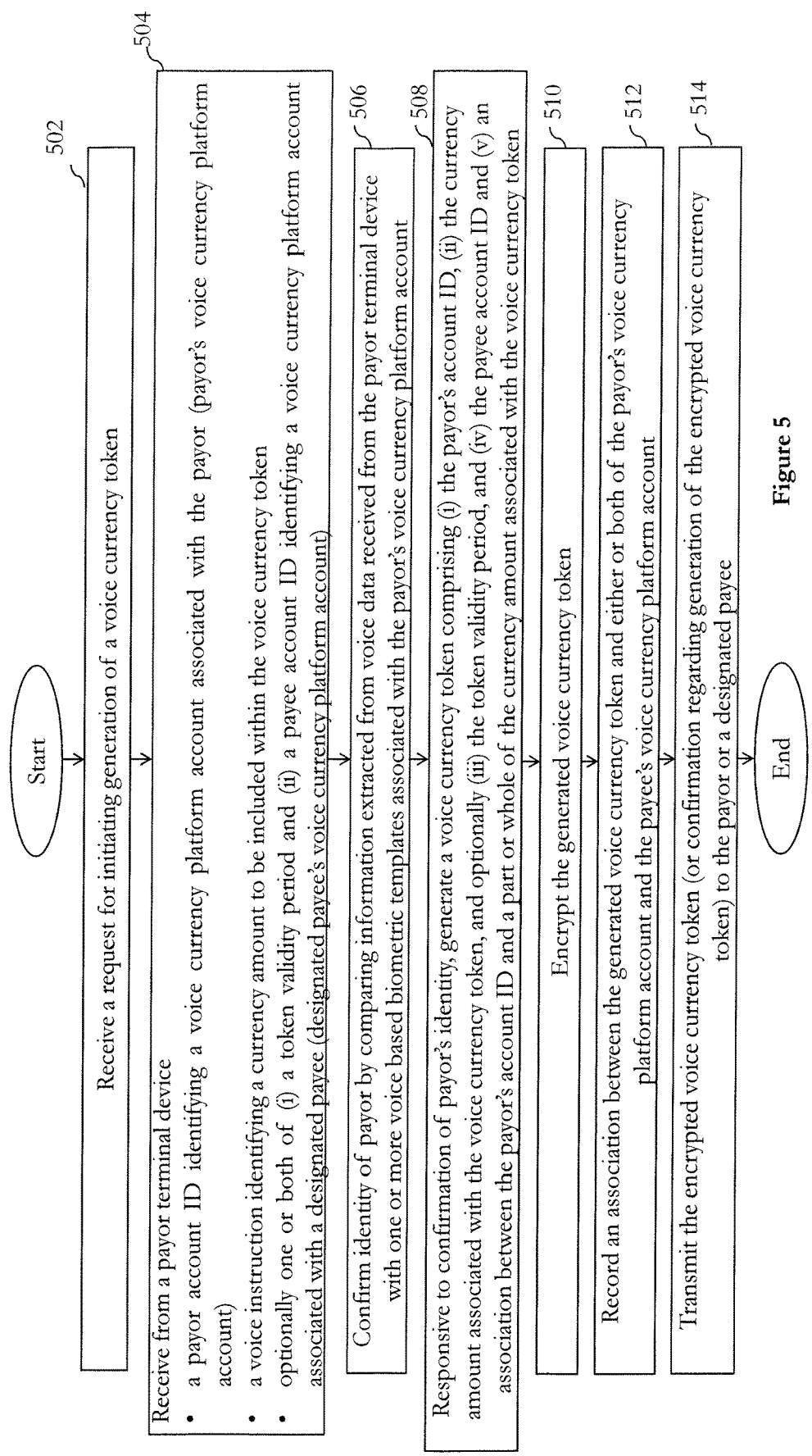

FIG. 5 is a flowchart illustrating a method for generating voice currency tokens in accordance with the present invention FIGS. 6, 8, 10 and 12 are communication flow diagrams illustrating communication flows respectively involved in the methods of FIGS. 5, 7, 9 and 11.

Figure 7:
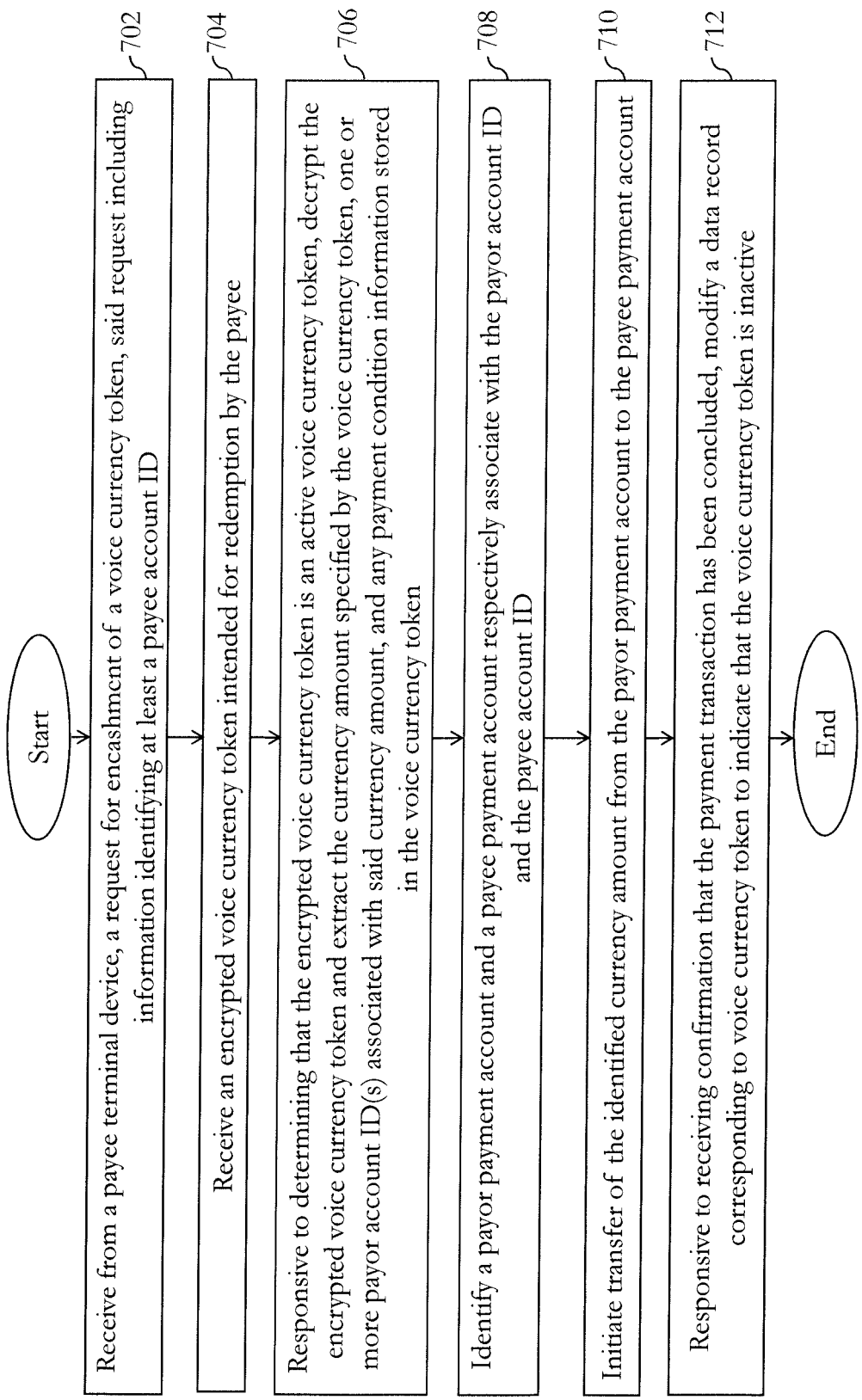

FIG. 7 comprises a flowchart illustrating a method for redeeming or encashing voice currency tokens that have been generated in accordance with the teachings of the present invention.

Figure 9:
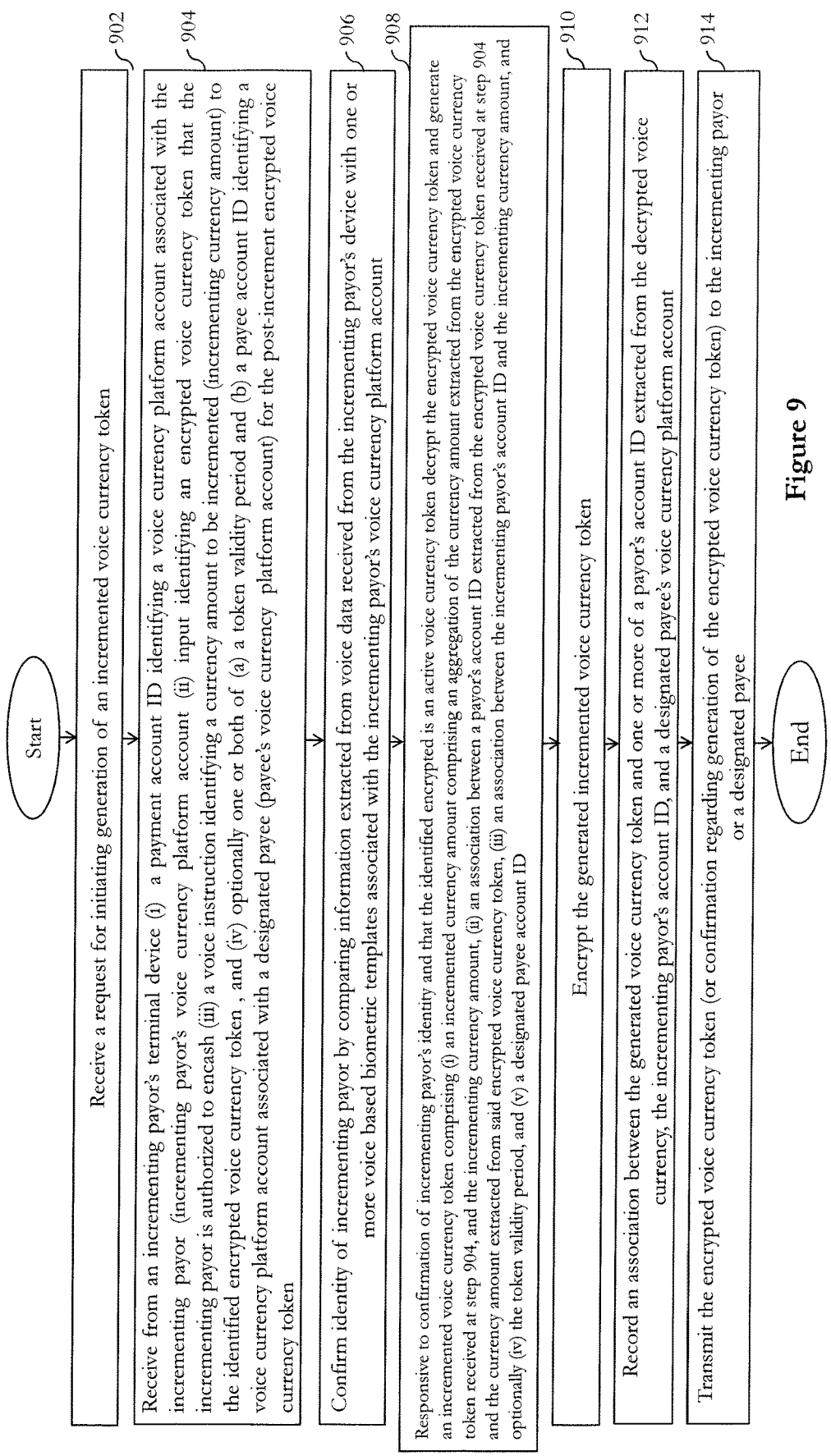

FIG. 9 comprises a flowchart illustrating a method for incrementing the currency amount within a previously generated voice currency token.

Figure 11:
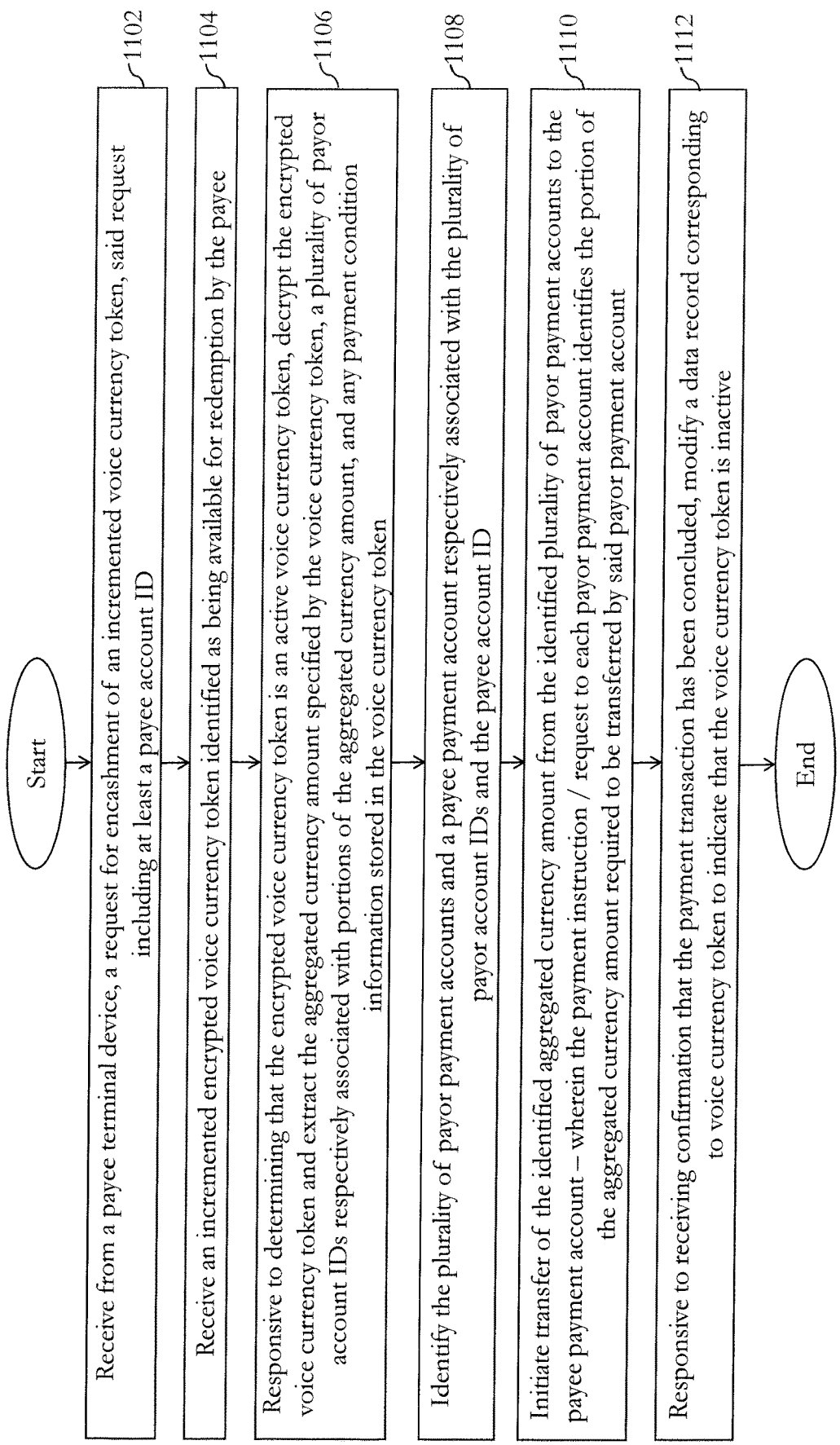

FIG. 11 comprises a flowchart illustrating a method for redeeming or encashing incremented voice currency tokens that have been generated in accordance with the teachings of the present invention.

Figure 13:
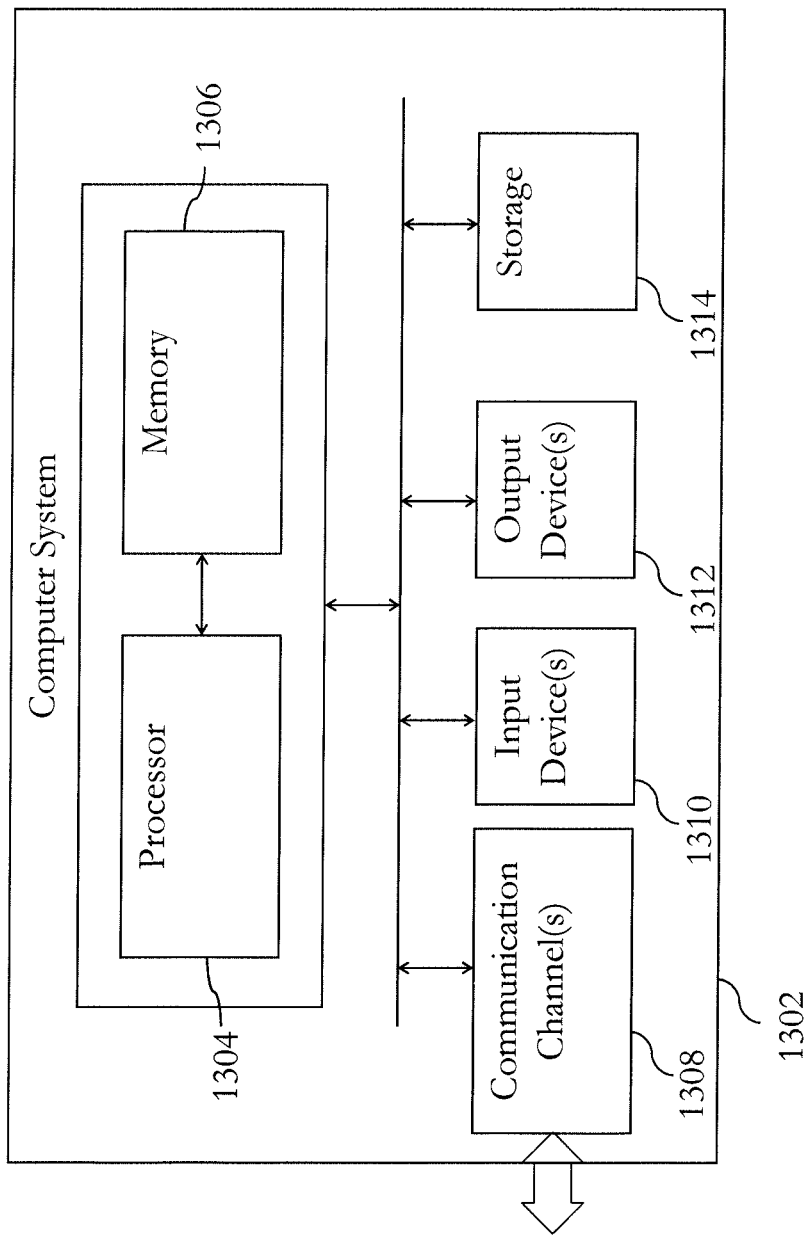

FIG. 13 is an exemplary computer system according to which various embodiments of the present invention may be implemented.

DETAILED DESCRIPTION

The present invention is directed towards implementing secure electronic payment transactions based on voice generated currency tokens.

For the purposes of the present invention, the following terms shall be understood to have the corresponding meanings provided below:

"Payment account" shall mean any account that may be used for the purposes of effecting an electronic payment or electronic transaction, and shall include any electronic transaction account, payment card account, bank account or electronic wallet account.

"Payment network" shall refer to an intermediary between a payor's bank and a payee's bank, which intermediary is authorized by both banks to mediate or effect a payment transaction between accounts held at each of the two banks. Examples of payment networks include the Mastercard® or Visa® payment networks. The payment network primarily coordinates payment transactions between acquirers and issuers, and additionally coordinates clearing and settlement services to transfer payments from issuers to merchants.

Figure 1:
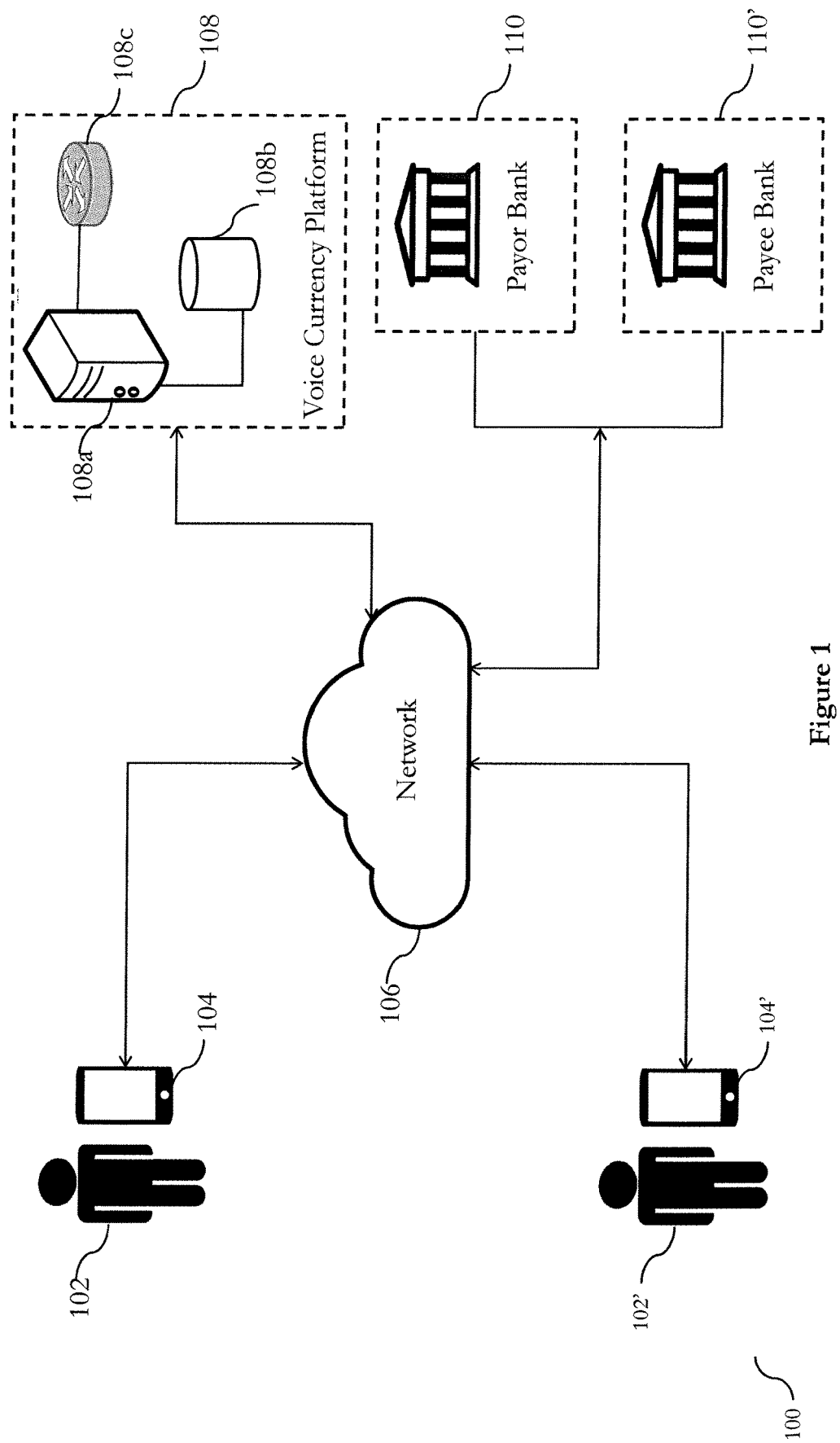
FIG. 1 illustrates a system environment for implementing voice currency token based electronic payment transactions.

FIG. 1 illustrates a system environment 100 that can be used for implementing electronic transactions based on voice generated currency tokens.

As illustrated in FIG. 1, system environment 100 includes a plurality of users/individuals/entities or payment account holders 102, 102' interacting with system environment 100 through their respective terminal devices 104, 104'. The plurality of terminal devices 104, 104' are configured for network based communication with one or more other entities through network 106.

Voice currency platform 108 may be communicably coupled with one or more of terminal devices 104, 104' (for example through network 106), and comprises voice currency server 108a, voice currency platform database 108b and voice currency platform interface gateway 108c. Voice currency server 108a may be configured to generate voice based currency tokens, enable and track transfer of such voice based currency tokens from one individual/entity to another, and to enable settlement of payment between a payor and a payee upon redemption of one or more voice based currency tokens.

In an embodiment, voice currency platform 108 may be implemented within a payment network that enables payment transactions between individuals/entities or bank accounts associated with such individuals/entities—for example within any one of the MasterCard®, VISA®, Discover® or American Express® payment networks. In such embodiments, voice currency platform 108 may be configured to enable individuals/entities who are authorized to use the services of the concerned payment network (for example cardholders who have been issued payment cards or payment accounts associated with the concerned payment network), to carry out payment transactions over said payment network using the voice currency token generation and voice currency token redemption capabilities of voice currency platform 108 that are discussed in more detail below.

In certain embodiments, voice currency platform enables payment transactions using voice based currency tokens, only between individuals or entities that are registered with or authorized to use the services of voice currency platform 108. A determination whether an individual/entity is authorized to use services of voice currency platform 108 may be made based on information retrieved from voice currency platform database 108b. Voice currency platform interface gateway 108c may include a hardware or software network gateway configured to enable voice currency platform 108 to communicate with network 106 and/or other entities within system environment 100.

Voice currency platform 108 may additionally be configured for network based communication with one or more banks 110, 110' (for example, a payor's bank and a payee's bank) to enable voice currency platform 108 to effect transfer of payments from a payor's bank account held with a first bank 110 to a payee's bank account 110' held with a second bank.

In a particular embodiment, voice currency platform 108 may be configured to interface or communicate with said banks through a payment network for the purposes of effecting payment transfers between banks (for example through any one of the MasterCard®, VISA®, Discover® or American Express® payment networks).

Figure 2:
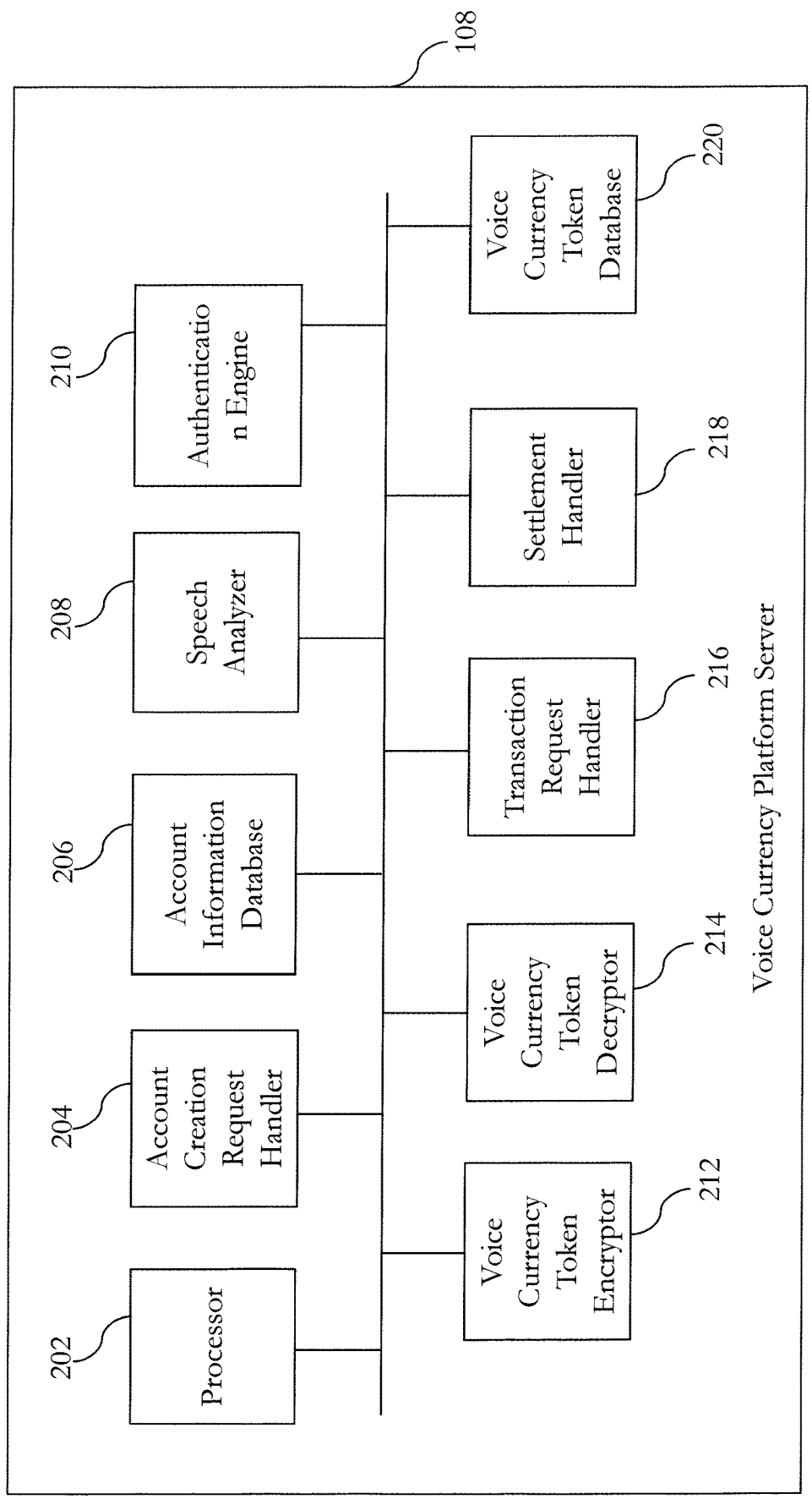
FIG. 2 illustrates an embodiment of a server within a voice currency platform.

FIG. 2 illustrates an embodiment of voice currency platform server 108a, comprising components 202 to 220. As shown in FIG. 2, voice currency platform server 108a includes at least processor 202, account creation request handler 204, account information database 206, speech analyzer 208, authentication engine 210, voice currency token encryptor 212, voice currency token decryptor 214, transaction request handler 216, settlement handler 218 and voice currency token database 220. The configuration and functionality of the above components is described in more detail in connection with FIGS. 3 to 12. In an embodiment, voice currency platform server 108a may comprise one or more servers implemented within a payment network that enables payment transactions between individuals/entities or bank accounts associated with such individuals/entities—for example within any one of the MasterCard®, VISA®, Discover® or American Express® payment networks.

FIG. 3 comprises a flowchart illustrating a method of creating a user account at voice currency platform server 108a.

Step 302 of FIG. 3 comprises generating at voice currency platform server 108a, a user account associated with an individual/entity that has requested creation of said account. In an embodiment, said user account may be generated in response to a request for creation of an account being received at account creation request handler 202—which request may have been transmitted by a terminal device being operated by a requesting individual/entity. The account creation request handler 204 may interface with processor 202 and generate the requested account—wherein information corresponding to the generated account may be stored in account information database 206.

Step 304 comprises enrolling a payment account that is associated with the requesting user/entity, with the generated user account. In an embodiment, this step may include storing information corresponding to the payment account in a data record that has been associated with the generated user account within account information database 206.

Step 306 comprises receiving one or more voice sample(s) from the requesting user/requesting entity, and generating one or more voice sample based biometric templates based on voice biometric information extracted from the received voice samples. The voice samples may be recorded by the requesting user/requesting entity at a terminal device having appropriate voice sample recording capabilities (which in an embodiment may comprise a smartphone or other mobile communication device having a voice transceiver) and may be transmitted to voice currency platform server 108a. Voice currency platform server 108a may be configured to analyze the received voice samples and generate corresponding voice sample based biometric templates using one or both of processor 202 and speech analyzer 208 operating in accordance with known methods of voice sampling and voice based biometric template generation.

At step 308, the generated voice sample based biometric template(s) is associated with the generated user account, and may in an embodiment be stored in one or more data records associated with the generated user account, within account information database 206.

FIG. 4A illustrates an exemplary data structure 400A that may be used to store data records associated with a user account that has been generated in accordance with the method of FIG. 3 (for example, within account information database 206). As shown in FIG. 4A, data structure 400A may include data fields or data records configured to enable storage of one or more of (i) an account ID used to identify a user account (generated at step 302), (ii) a payment account ID identifying a payment account that has been enrolled with the user account (at step 304), (iii) a voice biometric ID identifying one or more voice based biometric templates that have been associated with the user account (at step 308)—which voice based biometric templates may in certain embodiments be retrievable from account information database 206 based on the voice biometric ID, and (iv) voice currency token information—comprising one or more of (i) information identifying one or more voice currency tokens that have either been generated by a user associated with the user account for transfer to another individual/entity, or which have been generated by another user for transfer to the individual/entity associated with the user account and (ii) the voice currency tokens themselves. A detailed explanation regarding said voice currency tokens and the manner in which they are generated, modified and redeemed is provided in connection with FIGS. 5 to 12 hereinbelow.

FIG. 5 is a flowchart illustrating a method for generating voice currency tokens in accordance with the present invention.

Step 502 comprises receiving a request for initiating generation of a voice currency token. Said request may be received at voice currency platform server 108a. In an embodiment, said request is received from a terminal device being operated by a payor who intends to generate a voice currency token for effecting an electronic payment to a payee. In a specific embodiment of the invention, one or both of the payor and the payee are necessarily individuals/entities who are enrolled with or have user accounts with voice currency platform server 108a (for example through the method of FIG. 3).

The request for initiating generation of a voice currency token may be received through an interface provided on the terminal device being operated by the payor. In an embodiment of the invention, the interface is configured to receive (for example through a voice transceiver or other audio sensors) voice based instructions from a user of the terminal device—which voice based instructions may include a voice based instruction for initiating generation of a voice currency token. In a particular embodiment of the invention, where the instruction for initiating generation of a voice currency token is a voice based instruction, said voice based instruction is received by speech analyzer 208 within voice currency platform server 108a. Speech analyzer 208 may be configured to receive voice data, analyze such voice data, extract speech content from the received voice data, and identify within the extracted speech content any instructions or inputs that the voice currency platform server 108a has been configured to respond to.

Step 504 comprises receiving from the payor's terminal device (i) a payor account ID identifying a voice currency platform account associated with the payor (the payor's voice currency platform account), (ii) a voiced instruction identifying a currency amount to be included within the voice currency token intended for generation, and optionally one or both of (iii) a validity period for which the voice currency token under generation is intended to be valid/redeemable and (iv) a payee account ID identifying a voice currency platform account associated with a designated payee (the designated payee's voice currency platform account). In an embodiment of the invention, the information is received by voice currency platform 108a in the form of one or more voice based inputs from the payor's terminal device, and the information described hereinabove is extracted from said voice based inputs by speech analyzer 208.

It would be understood from step 504 that when generating a voice currency token, the payor may intend the token to be redeemed by any individual/entity—in which case the information provided at step 504 may not include information identifying a designated payee's voice currency platform account. If on the other hand, the payor intends for the token to be redeemed by a specific individual/entity, the payor may include information identifying a designated payee's voice currency platform account.

The payor may optionally also choose to specify a validity period within which the generated voice currency token can be redeemed. If the voice currency token is not redeemed/submitted for payment, the voice currency token generated based on the information at step 504 may be rendered inactive or invalid. In a specific embodiment of the invention, generation of a voice currency token results in a hold being placed at the payor's bank account (the bank account enrolled by the payor at voice currency platform server 108*a*) on funds equal to the currency value of the generated voice currency token. Said hold may be retained on the funds within the payor's bank account for the duration of validity of the generated voice currency token, or until the voice currency token is encashed and the held funds are transferred from the payor's bank account to a payee bank account.

Step 506 comprises confirming the identity of the payor by comparing information extracted from voice data received from the payor terminal device with one or more voice sample based biometric templates that have been associated with the payor's voice currency platform account. In an embodiment of the invention, the step of analyzing the voice data received from the payor terminal device and comparing said voice data against stored voice sample based biometric templates is implemented at authentication engine 210—which authentication engine may be configured for voice based biometric comparison and authentication—in accordance with any one or more voice based biometric techniques known in the art.

Responsive to confirmation of the payor's identity (i.e. responsive to finding a biometric match between the voice data received from the payor's terminal device and the one or more voice sample based biometric templates that have been associated with the payor's voice currency platform account), step 508 comprises generating a voice currency token comprising (i) the payor's account ID, (ii) the currency amount associated with the voice currency token, and optionally one or more of (iii) the token validity period, (iv) a designated payee account ID and (v) an association between the payor's account ID and a part or whole of the currency amount associated with the voice currency token.

While the respective function of the token validity period and the designated payee account ID have been discussed above (in connection with step 504), the optional recording of an association between the payor's account ID and the currency amount specified by the voice instruction is intended for use in connection with invention embodiments where the currency amount associated with a voice currency token can be incremented by a recipient of the voice currency token (discussed in further detail in connection with FIGS. 9 to 13). In such cases a plurality of individuals/entities become respectively responsible for payment of parts of the total currency amount included within a voice currency token—and recording of associations between each payor and a corresponding part of the total token currency value enables each payor to be charged or debited for its respective share of the total token currency value.

The generated voice currency token may be stored in a data record—a non-limiting exemplary format for which is illustrated as data record 400B in FIG. 4B. In an embodiment, the generated voice currency token may be stored in voice currency token database 220.

At step 510, the generated voice currency token is encrypted—using one or more encryption methods that are known in the art. In an embodiment, encryption may be implemented by voice currency token encryptor 212 within voice currency platform server 108*a*. The encryption ensures that once encrypted, the voice currency token can be decrypted (and data can be subsequently extracted from such decrypted voice currency token) only by legitimate or authorized entities (for example, individuals/entities/devices that are enrolled with or authorized by voice currency platform 108. The generated voice currency token may be stored in voice currency token database 220.

In an embodiment of the invention, the output of step 510 is a voice currency token that has been encrypted and/or exported into the format of an audio file that is playable by one or more media player softwares. In another embodiment, the generated playable audio file is encoded such that playback of the audio file using a media player does not result in audio presentation of the content of the generated voice currency token, and instead results in presentation of any standardized or non-standard audio output. Stated differently, encrypting the generated voice currency token data record outputs a playable audio file configured such that playback of the audio file results in presentation of audio output that omits the contents of information fields within the generated voice currency data record. By hearing the standardized or non-standard audio output, the listener is only able to ascertain that the received audio file is in fact a valid voice currency token, but not any other contents thereof.

Step 512 comprises recording an association between the generated voice currency token and either or both of the payor's voice currency platform account and a designated payee's voice currency platform account. In an embodiment, said association(s) may be stored in one or both of account information database 206 and voice currency token database 220. By recording associations between voice currency tokens and payor/payee voice currency platform accounts, the voice currency platform 108 eliminates the risk of fake voice currency tokens (i.e. voice currency tokens that have not been validly generated by voice currency platform 108) being used to spoof genuine voice currency tokens—since such fake voice currency tokens would not have been properly associated with a payor account or a payee account at voice currency platform server 108*a*.

Step 514 comprises transmitting either or both of the encrypted voice currency token and confirmation regarding generation of the voice currency token to the payor or to a designated payee. In an embodiment of the invention, where the payor who has requested generation of a voice currency token has not specified a designated payee or a designated payee voice currency platform account, the generated voice currency token (or a corresponding token ID or link to a location where the voice currency token has been electronically stored) may be electronically transmitted to the payor—for onward forwarding to any individual/entity that the payor intends.

In another embodiment, where the payor who has requested generation of a voice currency token has specified a designated payee or a designated payee voice currency platform account, confirmation of generation of the voice currency token is forwarded to the payor while simultaneously (i) the generated voice currency token (or a corresponding token ID or link to a location where the generated voice currency token has been electronically stored) may be electronically transmitted to the designated payee, or (ii) the generated voice currency token is associated with the designated payee's voice currency platform account and confirmation of generation of the voice currency token and its association with the designated payee's account may be forwarded to the payee.

Figure 6:
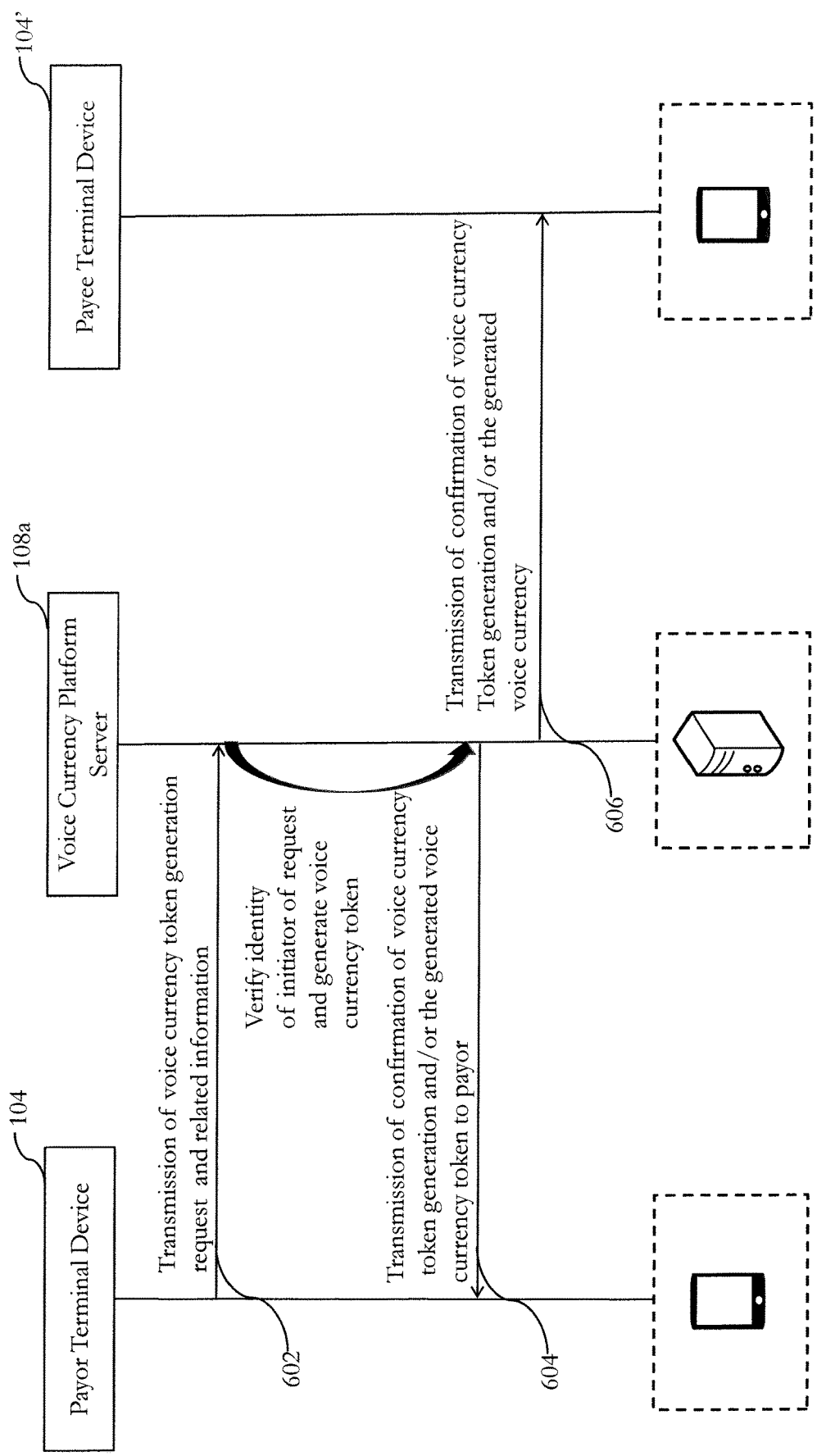

FIG. 6 is a communication flow diagram illustrating an exemplary communication flow in implementing the method of FIG. 5.

At step 602, payor terminal device 104 transmits a voice currency token generation request along with information relevant to generation of said request (for example, the information identified at step 504 of FIG. 5) to voice currency platform server 108a. Voice currency platform server 108a verifies the identity of the initiator of the request and responsive to a positive identification match, generates the requested voice currency token (in accordance with method steps 506 to 512 of FIG. 5). Thereafter, steps 604 and 606 respectively comprise (i) transmission of confirmation of generation of the requested voice currency token and/or the generated voice currency token from voice currency platform server 108a to payor terminal device 104, and/or (ii) transmission of confirmation of generation of the requested voice currency token and/or the generated voice currency token from voice currency platform server 108a to the payee terminal device 104' (in accordance with step 514 of FIG. 5).

FIG. 7 comprises a flowchart illustrating a method for redeeming or encashing voice currency tokens that have been generated in accordance with the teachings of the present invention. It would be understood that redeeming or encashing voice currency tokens may involve two possible events—the first, where a voice currency token specifies a designated payee, and the second where the voice currency token does not specify a designated payee. Both events are discussed in the following paragraphs.

Step 702 comprises receiving from a payee terminal device (i.e. from a terminal device being operated by an individual/entity seeking to redeem or encash a voice currency token), a request for encashment of a voice currency token. Said request may be received at a transaction request handler 216 within voice currency platform server 108a and may include at least information identifying a payee account ID.

It would be understood that the request of step 702 and other information received from the payee terminal device may in an embodiment be received by way of voice instructions, which voice instructions may be analyzed by speech analyzer 208 and from which actionable instructions or inputs that are required for the method of FIG. 7 are extracted by speech analyzer 208.

Step 704 comprises receiving an encrypted voice currency token that is intended to be redeemed or encashed by the payee.

For the purposes of step 704, the encrypted voice currency token may be received at processor 202 of voice currency platform server 108a in one of several ways. In one, the encrypted voice currency token that is sought to be redeemed is transmitted to voice currency platform server 108a by a payee terminal device (if such voice currency token has been forwarded to the payee and is available for transmission at the payee terminal device). In another, a corresponding token ID or link to a location where the voice currency token has been electronically stored, is transmitted to voice currency platform server 108a by a payee terminal device (if such token ID or link has been forwarded to the payee and is available for transmission from the payee terminal device).

In a specific embodiment of the invention where the voice currency token sought to be encashed is a voice currency token that specifically identifies a designated payee, the designated payee may not require to transmit the encrypted voice currency token (or a token ID or link thereto) that is sought to be redeemed. Instead processor 202 within voice currency platform server 108a may be configured to retrieve all active or valid voice currency tokens that are associated with the designated payee's voice currency platform account, and may respond to receipt of the payee's request for encashment of a voice currency token by presenting the requesting payee with all encrypted voice currency tokens that designate the requesting payee as the intended payment target, and may request said requesting payee to select one or more of such encrypted voice currency tokens that the requesting payee intends to encash or redeem. The selected one or more encrypted voice currency tokens may thereafter be retrieved from voice currency token database 220.

Responsive to determining that the received encrypted voice currency token is a valid voice currency token (for example, by confirming that a defined validity period associated with said encrypted voice currency token has not expired or that the encrypted voice currency token has not previously been encashed), step 706 comprises decrypting the encrypted voice currency token and extracting (i) the currency amount specified within the encrypted voice currency token, (ii) the payor account ID(s) associated with said currency amount, and any payment condition information (i.e. information identifying conditions in which the voice currency token may or may not be encashed). Said decryption may be implemented by voice currency token decryptor 214—which voice currency token decryptor 214 may in an embodiment be configured to decrypt tokens that have been previously encrypted by voice currency token encryptor 212.

Step 708 comprises identifying a payor payment account and a payee payment account for the voice currency token encashment transaction being implemented. In an embodiment, the payor payment account may be identified by using the payor account ID(s) extracted at step 706, to lookup user account information associated with said payor account ID(s)—and to retrieve information identifying the payment account that has been enrolled by the payor with the voice currency platform account corresponding to said payor account ID (for example, by retrieving such data from the data records that have been associated with the payor's voice currency platform account and that are stored in account information database 206).

The payee account may similarly be identified by using the payee account ID(s) received at step 702 to lookup user account information associated with said payee account ID(s), and thereafter retrieve information identifying the payment account that has been enrolled by the payee with the voice currency platform account corresponding to said payee account ID (for example, by retrieving said data from the data records that have been associated with the payee's voice currency platform account and that are stored in account information database 206).

At step 710, transfer of the identified currency amount (i.e. the currency amount extracted from the decrypted voice currency token) is initiated from the payor payment account to the payee payment account. In a particular embodiment, said transfer is initiated by settlement handler 218—which may be authorized and configured to communicate with the payor's bank 110 and payee's bank 110'—and to request a transfer of the currency amount from the payor payment account held with the payor's bank 110 to the payee payment account held with the payee's bank 110'. In a specific embodiment, transaction handler 218 may be configured to interface with a payment network to effect the transfer of the currency amount between the payor payment account and the payee payment account.

At step 712, responsive to receiving confirmation that the payment transaction has been concluded, a data record corresponding to the encashed voice currency token may be modified to indicate that the voice currency token has been encashed and is therefore invalid/inactive/non-redeemable. Recording the voice currency token as invalid/inactive ensures that the same voice currency token is not used to debit a payor payment account twice. In an embodiment, the modified data record may be stored in voice currency token database 220.

Figure 8:
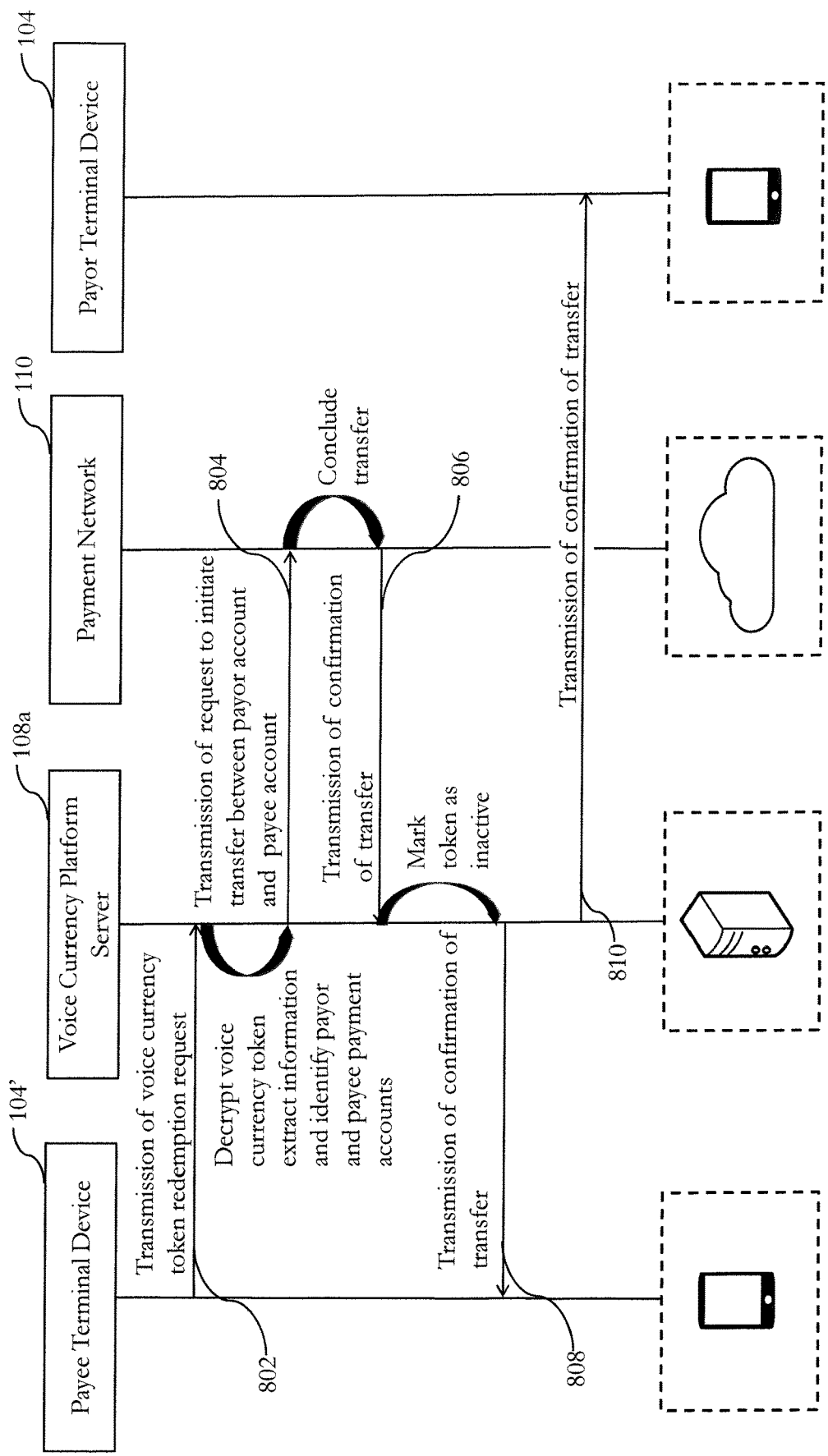

FIG. 8 is a communication flow diagram illustrating an exemplary communication flow for implementing the method of FIG. 7.

At step 802, payee terminal device 104' transmits a voice currency token encashment request to voice currency platform server 108a. Voice currency platform server 108a decrypts a received voice currency token, extracts information of relevance from the decrypted voice currency token and identifies the payor payment account and the payee payment account (in accordance with method steps 706 and 708 of FIG. 7). Thereafter, step 804 involves transmission of a request to initiate transfer of the currency amount associated with the decrypted voice currency token from voice currency platform server 108a to a payment network 110. Payment network 110 concludes the transfer of the currency amount from the payor account to the payee account and at step 806 transmits confirmation of the transfer back to voice currency platform server 108a. Responsive to receiving confirmation that the payment has been concluded, voice currency platform server 108a marks the encashed voice currency token as inactive/invalid, and at steps 808 and 810 respectively transmits confirmation of the transfer to payee terminal device 104' and to payor terminal device 104.

FIG. 9 comprises a flowchart illustrating a method for incrementing the currency amount within a previously generated voice currency token.

Step 902 comprises receiving a request for initiating generation of an incremented voice currency token. Said request may be received at voice currency platform server 108a. In an embodiment, the request is received from a terminal device being operated by a payor (an incrementing payor) who intends to increment the currency amount within a previously generated voice currency token. The incrementing payor may be an individual/entity who is enrolled with or has a user account with voice currency platform server 108a (for example through the method of FIG. 3). In one embodiment, the previously generated voice currency token being incremented may be a voice currency token that records the incrementing payor as a designated payee. In another embodiment, the voice currency token may not designate a payee, and the incrementing payor may have received the voice currency token or a corresponding token ID or a link to a location where the voice currency token has been electronically stored, through electronic transmission.

Step 904 comprises receiving from the incrementing payor's terminal device (i) an incrementing payor account ID identifying a voice currency platform account associated with the incrementing payor (i.e. the incrementing payor's voice currency platform account), (ii) an input identifying a previously generated encrypted voice currency token that the incrementing payor intends to increment, (iii) a voice instruction or other input identifying a currency amount sought to be added or incremented to the identified previously generated encrypted voice currency token, and optionally one or both of (iv) a validity period for which the incremented voice currency token is intended to be valid/redeemable and (v) a payee account ID identifying a voice currency platform account associated with a designated payee (i.e. the designated payee's voice currency platform account) for the post-increment voice currency token. In an embodiment of the invention, some or all of the above information is received by voice currency platform 108a in the form of one or more voice based inputs from the incrementing payor's terminal device, and the information is extracted from said voice based inputs by speech analyzer 208.

The incrementing payor may, at step 904, optionally choose to specify a validity period within which the incremented voice currency token is intended to be redeemed. If the incremented voice currency token is not redeemed/submitted for encashment within this validity period, said incremented voice currency token may be rendered inactive or invalid.

Step 906 comprises confirming the identity of the incrementing payor by comparing information extracted from voice data received from the incrementing payor terminal device with one or more voice sample based biometric templates that have been associated with the incrementing payor's voice currency platform account. In an embodiment of the invention, the steps of analyzing the voice data received from the incrementing payor terminal device and of comparing said voice data against stored voice sample based biometric templates is implemented at authentication engine 210 within voice currency platform server 108a.

Responsive to confirmation of the incrementing payor's identity (i.e. responsive to finding a biometric match between the voice data received from the incrementing payor's terminal device and the one or more voice sample based biometric templates that have been associated with the incrementing payor's voice currency platform account), step 908 comprises generating an incremented voice currency token comprising (i) an incremented currency amount having a value equal to an aggregated value of the currency amount extracted from the previously generated encrypted voice currency token identified at step 904 and the currency amount that is sought to be added by the incrementing payor, (ii) an association between a payor's account ID extracted from the previously generated encrypted voice currency token received at step 904 and the currency amount extracted from said previously generated encrypted voice currency token, (iii) an association between the incrementing payor's account ID and the currency amount that is sought to be added by said incrementing payor, and optionally one or both of (iv) a token validity period associated with the incremented voice currency token, and (v) a designated payee account ID.

It would be understood that an important feature of the method of incrementing a voice currency token is recording associations between portions of the total incremented voice currency amount and the respective payors who are responsible for payment of the total incremented voice currency amount. By virtue of the recordal of said associations, subsequent to incrementing of a voice currency token, a first payor who has originally generated a voice currency token remains responsible for payment of the currency amount originally included within the voice currency token generated by said original payor, whereas the incrementing payor is responsible for such part of the incremented currency amount within the incremented voice currency token that has been added to said incremented voice currency token by the incrementing payor.

At step 910, the incremented voice currency token is encrypted—using one or more encryption methodologies that would be available to the skilled person. In an embodiment, the encryption may be implemented by voice currency token encryptor 212 within voice currency platform server 108*a*, and the encrypted incremented voice currency token may be stored in voice currency token database 220.

As in the case of the method described in connection with FIG. 5, in a preferred embodiment of the invention, the output of step 910 may comprise an incremented voice currency token that has been encrypted into the format of an audio file that is playable by one or more media player softwares. In a more preferred embodiment, the generated playable audio file is encoded such that playback of the audio file using an audio player does not result in audio presentation of the content of the generate voice currency token to a listener, and instead may result in presentation of any standardized or non-standard audio output. Stated differently, encrypting the generated voice currency token data record outputs a playable audio file configured such that playback of the audio file results in presentation of audio output that omits the contents of information fields within the generated voice currency data record. By hearing the standardized or non-standard audio output, the listener is only able to ascertain that the received audio file is in fact a valid voice currency token but not any other contents thereof.

Step 912 comprises recording association(s) between the incremented voice currency token and one or more of the incrementing payor's voice currency platform account, the original payor's (i.e. the payor that generated the previously generated encrypted voice currency token that has been subsequently incremented) voice currency platform account and a designated payee's voice currency platform account. In an embodiment, said association(s) may be stored in one or both of account information database 206 and voice currency token database 220. By recording the associations between voice currency tokens and payor/payee voice currency platform accounts, the voice currency platform 108 eliminates the risk of fake voice currency tokens (i.e. voice currency tokens that have not been validly generated by voice currency platform 108) or invalidly incremented voice currency tokens being used to spoof genuine voice currency tokens—since such fake or invalidly incremented voice currency tokens would not have appropriately recorded associations with a payor account, incrementing payor account or a payee account at voice currency platform server 108*a*.

Step 914 comprises transmitting either (or both of) the encrypted incremented voice currency token and confirmation regarding generation of the incremented voice currency token to the incrementing payor or to a designated payee. In an embodiment of the invention, where the incrementing payor who has requested incrementing of a voice currency token has not specified a designated payee or a designated payee voice currency platform account, the generated encrypted incremented voice currency token (or a corresponding token ID or link to a location where the encrypted incremented voice currency token has been electronically stored) may be electronically transmitted to the incrementing payor—for onward forwarding to any individual/entity that the incrementing payor intends.

In another embodiment, where the incrementing payor who has requested incrementing of a previously generated encrypted voice currency token has specified a designated payee or a designated payee voice currency platform account, confirmation of generation of the incremented voice currency token is forwarded to the incrementing payor while simultaneously (i) the incremented voice currency token (or a corresponding token ID or link to a location where the incremented voice currency token has been electronically stored) may be electronically transmitted to the designated payee, or (ii) the incremented voice currency token is associated with the designated payee's voice currency platform account and confirmation of generation of the incremented voice currency token and its association with the designated payee's account is forwarded to the designated payee. In embodiments of the invention where the incremented voice currency token was not generated for redemption by a specific payee, the incremented voice currency token or a corresponding token ID or link to the incremented voice currency token may be forwarded to the incrementing payor, or an incrementing payor terminal device—whereafter, the incrementing payor can choose to transmit the voice currency token or token ID or link to token to any individual or entity that the incrementing payor intends to transfer the voice currency to—for redemption by such transferee individual or entity.

Figure 10:
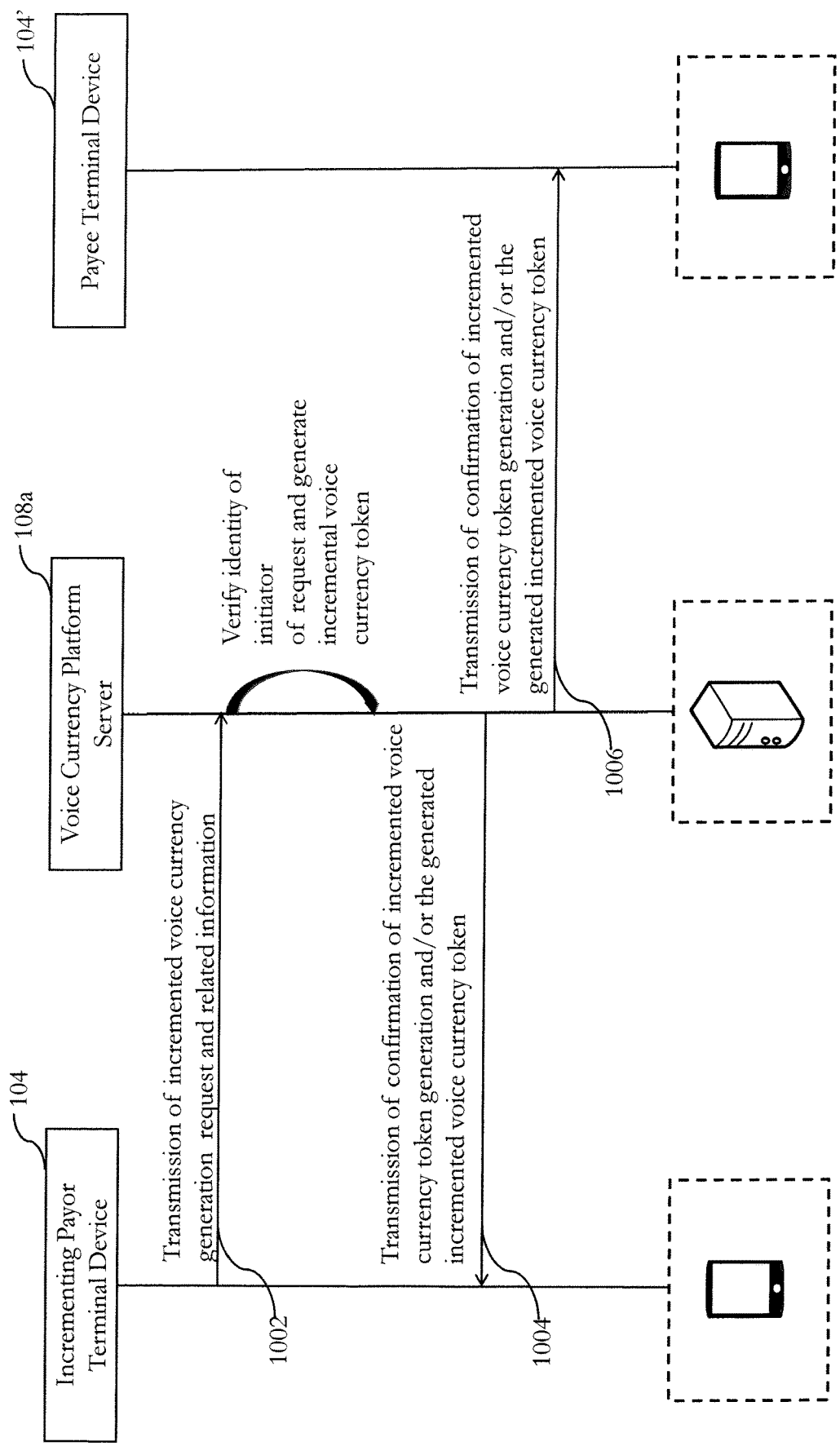

FIG. 10 is a communication flow diagram illustrating an exemplary communication flow in implementing the method of FIG. 9.

At step 1002, incrementing payor terminal device 104 transmits a incremented voice currency token generation request along with information relevant to generation of said request (for example, the information identified at step 904 of FIG. 9) to voice currency platform server 108*a*. Voice currency platform server 108*a* verifies the identity of the initiator of said request and responsive to a positive identification, generates the requested incremented voice currency token (in accordance with method steps 906 to 912 of FIG. 9). Thereafter, steps 1004 and 1006 respectively comprise (i) transmission of confirmation of generation of the incremented voice currency token and/or the generated encrypted incremented voice currency token from voice currency platform server 108*a* to incrementing payor terminal device 104 and/or (ii) transmission of confirmation of generation of the incremented voice currency token and/or the generated encrypted incremented voice currency token from voice currency platform server 108*a* to the payee terminal device 104' (in accordance with step 914 of FIG. 9).

FIG. 11 comprises a flowchart illustrating a method for redeeming or encashing incremented voice currency tokens that have been generated in accordance with the teachings of the present invention. Redeeming or encashing incremented voice currency tokens may involve two different possible events—the first, where an incremented voice currency token specifies a designated payee, and the second where the incremented voice currency token does not specify a designated payee. Both events are discussed in the following paragraphs.

Step 1102 comprises receiving from a payee terminal device (i.e. from a terminal device being operated by an individual/entity seeking to redeem or encash an incremented voice currency token), a request for encashment of an incremented voice currency token. Said request may be received at transaction request handler 216 within voice currency platform server 108*a* and may include at least information identifying a payee account ID.

It would be understood that the request of step 1102 and other information received from the payee terminal device may in an embodiment be received by way of voice instructions, which voice instructions may be analyzed by speech analyzer 208 and used to extract actionable instructions or inputs that are required for the method of FIG. 11.

Step 1104 comprises receiving an encrypted incremented voice currency token that is identified by the payee as being available for redemption or identified as intended to be redeemed by the payee.

For the purposes of step 1104, it would be understood that the encrypted incremented voice currency token may be received at processor 202 of voice currency platform server 108*a* in one of several ways. In one, the encrypted incremented voice currency token that is sought to be redeemed is transmitted to voice currency platform server 108*a* by a payee terminal device (if such incremented voice token has been forwarded to the payee and is available for transmission at the payee terminal device). In another, a corresponding token ID or link to a location where the encrypted incremented voice currency token has been electronically stored, is transmitted to voice currency platform server 108*a* by a payee terminal device (if such token ID or link has been forwarded to the payee and is available for transmission from the payee terminal device).

In a specific embodiment of the invention, where the incremented voice currency token that is sought to be encashed is an incremented voice currency token that specifically identifies a designated payee, the designated payee may not require to transmit the encrypted incremented voice currency token (or a token ID or link thereto) that is sought to be redeemed. Instead processor 202 within voice currency platform server 108*a* would be able to retrieve all active or valid voice currency tokens (including any incremented voice currency tokens) that are associated with the designated payee's voice currency platform account, and may respond to receipt of a request for encashment of the incremented voice currency token by presenting the requestor with all voice currency tokens that designate the requestor as the intended payee, and by requesting identification of one or more of such voice currency tokens that the requestor intends to encash or redeem. The encrypted voice currency token may thereafter be retrieved from voice currency token database 220 based on identification by the payee as being the token intended for encashment or redemption.

Responsive to determining that the received encrypted incremented voice currency token is a valid voice currency token (for example, by confirming that a time validity period associated with said encrypted incremented voice currency token has not expired or that the encrypted incremented voice currency token has not previously been encashed), step 1106 comprises decrypting the encrypted voice currency token and extracting (i) the aggregated currency amount specified within the incremented voice currency token, (ii) the plurality of payor account ID(s) associated with respective portions of the aggregated currency amount, and any payment condition information (i.e. information identifying conditions in which the incremented voice currency token may or may not be encashed). Said decryption may be implemented by voice currency token decryptor 214—which voice currency token decryptor 214 may in an embodiment be configured to decrypt tokens that have been previously encrypted by voice currency token encryptor 212.

Step 1108 comprises identifying the plurality of payor payment accounts and a payee payment account respectively associated with the plurality of payor account IDs and the payee account ID—for the purposes of the token encashment transaction being implemented. In an embodiment, the plurality of payor payment accounts may be identified by using the payor account IDs extracted at step 1106 to (i) lookup user account information associated with said payor account IDs, and (ii) to retrieve information identifying the payment accounts that have been enrolled by each of the plurality of said payors with the voice currency platform accounts corresponding to said payor account IDs (for example, by retrieving said data from the data records that have been associated with each payor's voice currency platform account and that are stored in account information database 206). The payee account may similarly be identified by using the payee account ID received at step 1102 to lookup user account information associated with said payee account IDs, and retrieving information identifying the payment account that has been enrolled by the payee with the voice currency platform account corresponding to said payee account ID (for example, by retrieving said data from the data records that have been associated with the payee's voice currency platform account and that are stored in account information database 206).

At step 1110, transfer of the identified aggregated currency amount (i.e. the currency amount extracted from the decrypted incremented voice currency token) is initiated from the identified plurality of payor payment accounts to the payee payment account—wherein the payment instruction/request to each payor payment account identifies the portion of the aggregated currency amount required to be transferred by said payor payment account. In a particular embodiment, said transfer is initiated by settlement handler 218—which may be authorized and configured to communicate directly or indirectly with each payor's bank 110' and the payee's bank 110—and to request a transfer of the currency amount from each payor's payment account held with said payor's bank 110' to the payee payment account held with the payee's bank 110. In a specific embodiment, settlement handler 218 may be configured to interface with a payment network to effect the transfer of the currency amount between each payor's payment account and the payee payment account.

At step 1112, responsive to receiving confirmation that the payment transaction has been concluded, a data record corresponding to the encashed incremented voice currency token may be modified to indicate that the incremented voice currency token has been encashed and is therefore invalid/inactive. Recording the incremented voice currency token as invalid/inactive ensures that post-encashment, a voice currency token is not used to debit any of the payors' payment accounts a second time. In an embodiment, the modified data record may be stored in voice currency token database 220.

Figure 12:
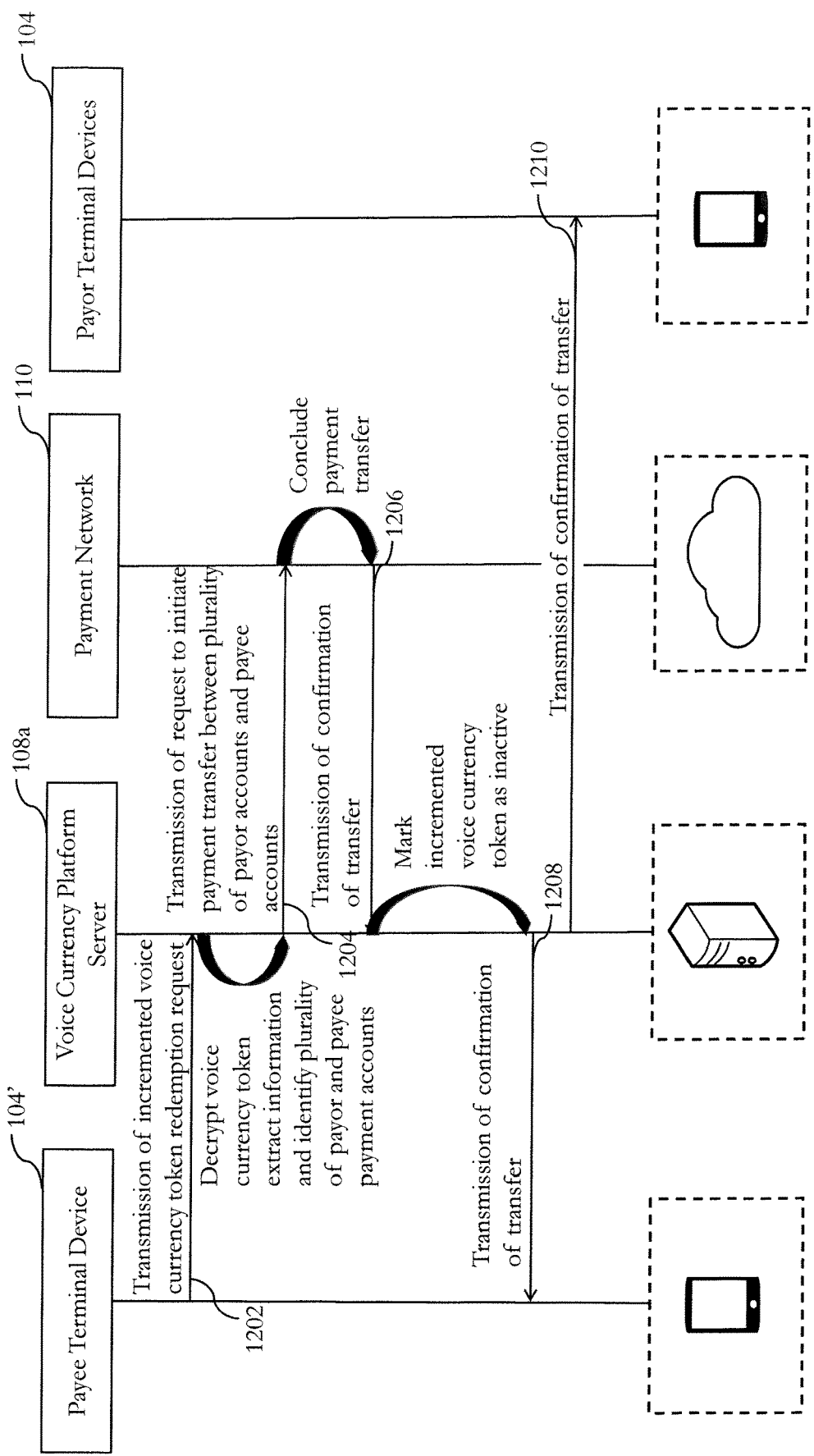

FIG. 12 is a communication flow diagram illustrating an exemplary communication flow in implementing the method of FIG. 11.

At step 1202, payee terminal device 104' transmits an incremented voice currency token redemption request to voice currency platform server 108*a*. Voice currency platform server 108*a* decrypts the encrypted incremented voice currency token that is sought to be encashed, extracts information of relevance from the said incremented voice currency token and identifies the plurality of payor payment accounts corresponding to the plurality of payors associated with said incremented voice currency token, as well as the payee payment account (in accordance with method step 1106 and 1108 of FIG. 11). Thereafter, step 1204 involves transmission of a request to initiate transfer of the currency amount associated with the decrypted incremented voice currency token from voice currency platform server 108*a* to a payment network 110. Payment network 110 concludes the transfer of the currency amount from the plurality of payor accounts to the payee account, and at step 1206 transmits confirmation of such transfer back to voice currency platform server 108a. Responsive to receiving confirmation that the payment has been concluded, voice currency platform server 108a marks the encashed incremented voice currency token as inactive/invalid, and at steps 1208 and 1210 respectively transmits confirmation of the transfer to payee terminal device 104' and to the plurality of payor terminal devices 104.

FIG. 13 illustrates an exemplary system 1300 for implementing the present invention.

System 1300 includes computer system 1302 which in turn comprises one or more processors 1304 and at least one memory 1306. Processor 1304 is configured to execute program instructions—and may be a real processor or a virtual processor. It will be understood that computer system 1302 does not suggest any limitation as to scope of use or functionality of described embodiments. The computer system 1302 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1302 in accordance with the present invention may include one or more servers, desktops, laptops, tablets, smart phones, mobile phones, mobile communication devices, tablets, phablets and personal digital assistants. In an embodiment of the present invention, the memory 1306 may store software for implementing various embodiments of the present invention. The computer system 1302 may have additional components. For example, the computer system 1302 may include one or more communication channels 1308, one or more input devices 1310, one or more output devices 1312, and storage 1314. An interconnection mechanism (not shown) such as a bus, controller, or network, interconnects the components of the computer system 1302. In various embodiments of the present invention, operating system software (not shown) provides an operating environment for various softwares executing in the computer system 1302 using a processor 1304, and manages different functionalities of the components of the computer system 1302.

The communication channel(s) 1308 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1310 may include, but is not limited to, a touch screen, a keyboard, mouse, pen, joystick, trackball, a voice device, a scanning device, or any another device that is capable of providing input to the computer system 1302. In an embodiment of the present invention, the input device(s) 1310 may be a sound card or similar device that accepts audio input in analog or digital form. The output device(s) 1312 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1302.

The storage 1314 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1302. In various embodiments of the present invention, the storage 1314 may contain program instructions for implementing any of the described embodiments.

In an embodiment of the present invention, the computer system 1302 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1302. The method described herein is typically implemented as a computer program product, comprising a set of program instructions that is executed by the computer system 1302 or any other similar device. The set of program instructions may be a series of computer readable codes stored on a tangible medium, such as a computer readable storage medium (storage 1314), for example, diskette, CD-ROM, ROM, flash drives or hard disk, or transmittable to the computer system 1302, via a modem or other interface device, over either a tangible medium, including but not limited to optical or analogue communications channel(s) 1308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

In an embodiment, the invention comprises a computer program product for implementing a voice currency token based payment system. The computer program product comprises a non-transitory computer usable medium having computer readable program code embodied therein, the computer readable program code comprising instructions for implementing any of the method embodiments described in the disclosure herein. In a specific embodiment, the non-transitory computer usable medium comprises computer readable program code comprising instructions for implementing the steps of (i) receiving from a payor terminal device (a) a request for generation of a voice currency token, (b) a payor account ID identifying a payor voice currency platform account associated with a payor, and (c) voice data comprising information identifying a currency amount to be included within the requested voice currency token, (ii) performing a first voice based biometric authentication by matching the voice data received from the payor terminal device against one or more voice based biometric templates associated with the payor voice currency platform account, (iii) performing speech analysis to extract at least the currency amount identified within the voice data received from the payor terminal device, (iv) responsive to the first voice based biometric authentication generating a positive identity match, generating an encrypted voice currency token. Generating the encrypted voice currency token may comprise (i) generating a voice currency token data record comprising (a) the payor account ID, (b) the currency amount identified within the received voice data, and (c) an association between at least a part of the currency amount within the generating voice currency data record and the payor voice currency platform account, and (ii) generating an encrypted voice currency token, wherein the encrypted voice currency token is generated by encrypting the voice currency token data record.

Based on the above, it would be apparent that the present invention offers a voice currency token based electronic payment system that provides a simplified payment interface which is easy to use and additionally meets the requirements of users who are unfamiliar with computer/smartphone based interfaces, or who have physical disabilities or visual impairments that prevent them from using the existing electronic payment solutions. The solutions of the present invention additionally provide systems and methods for electronic payments that are secure, authenticatable, anonymous, transferable and physical location independent.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for implementing a voice currency token based payment system, comprising implementing at a voice currency platform server, the steps of:
    receiving, by a speech analyzer of the voice currency platform server, voice data from a payor terminal device, the voice data including a voice based instruction including:
        a request to generate a voice currency token;
        a payor account ID identifying a payor voice currency platform account associated with a payor; and
        a currency amount to be included within the requested voice currency token;
    matching the voice data to one or more voice based biometric templates associated with the payor voice currency platform account using an authentication engine of the voice currency platform server;
    extracting at least the currency amount identified within the voice data using the speech analyzer;
    in response to matching the voice data, generating an encrypted voice currency token, wherein generating the encrypted voice currency token comprises:
        generating a voice currency token data record comprising (i) the payor account ID (ii) the currency amount identified within the received voice data, and (iii) an association between at least a part of the currency amount within the generating voice currency data record and the payor voice currency platform account;
        storing the voice currency token data record in a voice currency token database of the voice currency platform server; and
        encrypting the voice currency token data record using a voice currency token encryptor of the voice currency token databases;
    receiving, by the speech analyzer, second voice data from an incrementing payor terminal device, the second voice data including a voice based instruction including:
        a request to increment the encrypted voice currency token;
        an incrementing payor account ID identifying an incrementing payor voice currency platform account associated with an incrementing payor; and
        an incremental currency amount to be incremented to the currency amount within the encrypted voice currency token;
    matching the second voice data to one or more voice based biometric templates associated with the incrementing payor voice currency platform account using the authentication engine;
    extracting at least the incremental currency amount identified within the second voice data received from the incrementing payor terminal using the speech analyzer; and
    in response to matching the second voice data, generating an incremented encrypted voice currency token, wherein generating the incremented encrypted voice currency token comprises:
        generating an incremented voice currency token data record comprising (i) the payor account ID (ii) the incrementing payor account ID, (iii) an aggregated currency amount having a value equal to an aggregation of the currency amount of the encrypted voice currency token and the incremental currency amount, (iv) an association between the payor voice currency platform account and the currency amount of the encrypted voice currency token, and (v) an association between the incrementing payor voice currency platform account and the incremental currency amount;
        storing the incremented voice currency token data record in the voice currency token database; and
        encrypting the incremented voice currency token data record using the voice currency token encryptor.

2. The method as claimed in claim 1, wherein the voice currency platform server:
    receives a payee account ID identifying a payee voice currency platform account associated with a designated payee corresponding to the requested voice currency token;
    includes the payee account ID within the generated voice currency token data record; and
    records an association between the generated encrypted voice currency token and the payee voice currency platform account.

3. The method as claimed in claim 1, wherein the voice currency platform server includes a voice currency token validity period within the generated voice currency token data record.

4. The method as claimed in claim 1, wherein the step of generating the encrypted voice currency token outputs a playable audio file configured such that playback of the audio file results in presentation of audio output that omits the contents of information fields within the generated voice currency data record.

5. The method as claimed in claim 1, wherein the step of generating the encrypted voice currency token is followed by transmitting to at least one of a payor terminal device and a designated payee terminal device, any of the encrypted voice currency token, a token ID corresponding to the encrypted voice currency token, an electronic link to a location where the encrypted voice currency token is stored, and confirmation regarding generation of the voice currency token.

6. The method as claimed in claim 1, comprising the further steps of:
receiving from a payee terminal device, a request for encashment of the encrypted voice currency token;
decrypting the encrypted voice currency token and extracting from the voice currency data record corresponding to the encrypted voice currency token, (i) the payor account ID and (ii) the currency amount identified within said voice currency data record;
receiving information identifying a payee account ID identifying a payee voice currency platform account;
identifying a payor bank account associated with the payor voice currency platform account;
identifying a payee bank account associated with the payee voice currency platform account; and
initiating transfer of the extracted currency amount from the payor bank account to the payee bank account.

7. The method as claimed in claim 6, wherein the information identifying the payee account ID is either received from the payee terminal device or is extracted from the voice currency data record corresponding to the encrypted voice currency token.

8. The method as claimed in claim 6, wherein subsequent to transferring the extracted currency amount from the payor bank account to the payee bank account, a data record corresponding to the encrypted voice currency token is modified to indicate that said encrypted voice currency token is non-redeemable.

9. The method as claimed in claim 1, comprising the further steps of:
receiving from a payee terminal device, a request for encashment of the incremented encrypted voice currency token;
decrypting the incremented encrypted voice currency token and extracting from the voice currency data record corresponding to the encrypted voice currency token, (i) the payor account ID (ii) the aggregated currency amount identified within said voice currency data record; (iii) the association between the payor voice currency platform account and the currency amount of the encrypted voice currency token, and (iv) the association between the incrementing payor voice currency platform account and the incremental currency amount;
receiving information identifying a payee account ID identifying a payee voice currency platform account;
identifying a payor bank account associated with the payor voice currency platform account;
identifying an incrementing payor bank account associated with the incrementing payor voice currency platform account;
identifying a payee bank account associated with the payee voice currency platform account;
transferring a first currency amount having a value equal to the currency amount of the encrypted voice currency token from the payor bank account to the payee bank account; and
transferring a second currency amount having a value equal to the incremental currency amount from the incrementing payor bank account to the payee bank account.

10. The method as claimed in claim 9, wherein the information identifying the payee account ID is either received from the payee terminal device or is extracted from the voice currency data record corresponding to the incremented encrypted voice currency token.

11. The method as claimed in claim 9, wherein subsequent to transferring the first currency amount from the payor bank account to the payee bank account and the second currency amount from the incrementing payor bank account to the payee bank account, a data record corresponding to the incremented encrypted voice currency token is modified to indicate that said incremented encrypted voice currency token is non-redeemable.

12. A system comprising a voice currency platform server, said voice currency platform server comprising:
voice currency token database;
a speech analyzer configured to receive voice data, analyze the voice data, extract speech content from the voice data, and identify a voice based instruction within the extracted speech content;
an authentication engine configured for voice based biometric comparison and authentication;
a voice currency token encryptor configured to encrypt data; and
a processor operatively coupled to the voice currency token database, the speech analyzer, the authentication engine, and the voice currency token encryptor, said processor configured to implement the steps of:
receiving, by the speech analyzer, the voice data from a payor terminal device, the voice data including the voice based instruction including:
a request to generate a voice currency token;
a payor account ID identifying a payor voice currency platform account associated with a payor; and
a currency amount to be included within the requested voice currency token;
matching the voice data to one or more voice based biometric templates associated with the payor voice currency platform account using the authentication engine;
extracting at least the currency amount identified within the voice data using the speech analyzer;
in response to matching the voice data, generating an encrypted voice currency token, wherein generating the encrypted voice currency token comprises:
generating a voice currency token data record comprising (i) the payor account ID (ii) the currency amount identified within the received voice data, and (iii) an association between at least a part of the currency amount within the generating voice currency data record and the payor voice currency platform account;
storing the voice currency token data record in the voice currency token database; and
encrypting the voice currency token data record using the voice currency token encryptors;
receiving, by the speech analyzer, second voice data from an incrementing payor terminal device, the second voice data including a voice based instruction including:
a request to increment the encrypted voice currency token;
an incrementing payor account ID identifying an incrementing payor voice currency platform account associated with an incrementing payor; and
an incremental currency amount to be incremented to the currency amount within the encrypted voice currency token;

matching the second voice data to one or more voice based biometric templates associated with the incrementing payor voice currency platform account using the authentication engine;

extracting at least the incremental currency amount identified within the second voice data received from the incrementing payor terminal using the speech analyzer; and in response to matching the second voice data, generating an incremented encrypted voice currency token, wherein generating the incremented encrypted voice currency token comprises:

generating an incremented voice currency token data record comprising (i) the payor account ID (ii) the incrementing payor account ID, (iii) an aggregated currency amount having a value equal to an aggregation of the currency amount of the encrypted voice currency token and the incremental currency amount, (iv) an association between the payor voice currency platform account and the currency amount of the encrypted voice currency token, and (v) an association between the incrementing payor voice currency platform account and the incremental currency amount;

storing the incremented voice currency token data record in the voice currency token database; and encrypting the incremented voice currency token data record using the voice currency token encryptor.

13. The system as claimed in claim 12, said processor configured to:

receive a payee account ID identifying a payee voice currency platform account associated with a designated payee corresponding to the requested voice currency token;

include the payee account ID within the generated voice currency token data record; and record an association between the generated encrypted voice currency token and the payee voice currency platform account.

14. The system as claimed in claim 12, said processor configured to include a voice currency token validity period within the generated voice currency token data record.

15. The system as claimed in claim 12, wherein in generating the encrypted voice currency token, said processor is configured to output a playable audio file configured such that playback of the audio file results in presentation of audio output that omits the contents of information fields within the generated voice currency data record.

16. The system as claimed in claim 12, said processor further configured to transmit to at least one of a payor terminal device and a designated payee terminal device, any of the encrypted voice currency token, a token ID corresponding to the encrypted voice currency token, an electronic link to a location where the encrypted voice currency token is stored, and confirmation regarding generation of the voice currency token.

17. The system as claimed in claim 12, said processor configured to:

receive from a payee terminal device, a request for encashment of the encrypted voice currency token;

decrypt the encrypted voice currency token and extract from the voice currency data record corresponding to the encrypted voice currency token, (i) the payor account ID and (ii) the currency amount identified within said voice currency data record;

receive information identifying a payee account ID identifying a payee voice currency platform account;

identify a payor bank account associated with the payor voice currency platform account;

identify a payee bank account associated with the payee voice currency platform account; and initiate transfer of the extracted currency amount from the payor bank account to the payee bank account.

18. The system as claimed in claim 12, said processor configured to:

receive from a payee terminal device, a request for encashment of the incremented encrypted voice currency token;

decrypt the incremented encrypted voice currency token and extract from the voice currency data record corresponding to the encrypted voice currency token, (i) the payor account ID (ii) the aggregated currency amount identified within said voice currency data record; (iii) the association between the payor voice currency platform account and the currency amount of the encrypted voice currency token, and (iv) the association between the incrementing payor voice currency platform account and the incremental currency amount;

receive information identifying a payee account ID identifying a payee voice currency platform account;

identify a payor bank account associated with the payor voice currency platform account;

identify an incrementing payor bank account associated with the incrementing payor voice currency platform account;

identify a payee bank account associated with the payee voice currency platform account;

initiate transfer of a first currency amount having a value equal to the currency amount of the encrypted voice currency token from the payor bank account to the payee bank account; and initiate transfer of a second currency amount having a value equal to the incremental currency amount from the incrementing payor bank account to the payee bank account.

* * * * *